United States Patent
Narahashi et al.

(10) Patent No.: US 6,963,758 B2
(45) Date of Patent: Nov. 8, 2005

(54) HIGH-SENSITIVITY WIRELESS RECEIVING DEVICE AND HIGH-FREQUENCY UNIT USED THEREFOR

(75) Inventors: Shoichi Narahashi, Yokosuka (JP); Kunihiro Kawai, Yokohama (JP); Kei Satoh, Yokosuka (JP); Toshio Nojima, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 426 days.

(21) Appl. No.: 10/130,278

(22) PCT Filed: Oct. 1, 2001

(86) PCT No.: PCT/JP01/08621

§ 371 (c)(1),
(2), (4) Date: May 28, 2002

(87) PCT Pub. No.: WO02/27962

PCT Pub. Date: Apr. 4, 2002

(65) Prior Publication Data

US 2002/0173343 A1 Nov. 21, 2002

(30) Foreign Application Priority Data

Sep. 29, 2000 (JP) .................................. 2000-297896
Jul. 16, 2001 (JP) .................................. 2001-215308

(51) Int. Cl.$^7$ ............................. H04M 1/00; H04B 7/00
(52) U.S. Cl. .................... 455/561; 455/562.1; 455/272; 455/277
(58) Field of Search ................................. 505/210, 700, 505/866, 201, 202; 333/99 S; 361/687; 455/562.1, 272, 277.1, 561, 117, 217, 66, 103, 128, 129

(56) References Cited

U.S. PATENT DOCUMENTS 5,828,944 A  10/1998  Uppaluri et al.
6,104,934 A  8/2000  Patton et al.

FOREIGN PATENT DOCUMENTS

| EP | 0 623 788 | 2/1998 |
| JP | 10-135715 | 5/1998 |
| JP | 10-224269 | 8/1998 |
| JP | 2000-183772 | 6/2000 |
| JP | 2000-236206 | 8/2000 |
| JP | 2001-251241 | 9/2000 |

Primary Examiner—Vivian Chin
Assistant Examiner—Eugene Yun
(74) Attorney, Agent, or Firm—Olbon, Spivak, McClelland, Maier & Neustadt, P.C.

(57) ABSTRACT

In a high sensitive radio receiver system for a diversity reception from two antennae per each of three sectors (SC1, SC3, SC3), a series connection of a bandpass filter ($3_1$ to $3_6$) and a low noise amplifier ($4_1$ to $4_6$) is contained in each of a plurality of vacuum chambers ($8_1$ to $8_6$), the interior of which is cooled by a distinct, separate cooling unit ($9_1$ to $9_6$). The two antennae per sector are connected to bandpass filters contained in different vacuum chambers.

25 Claims, 18 Drawing Sheets

POINT A: IMPEDANCE WHEN SUPERCONDUCTING
POINT B: IMPEDANCE WHEN NON-SUPERCONDUCTING

HIGH-SENSITIVITY WIRELESS RECEIVING DEVICE AND HIGH-FREQUENCY UNIT USED THEREFOR

TECHNICAL FIELD

The present invention relates to a high sensitive radio receiver system including bandpass filters which are cooled for reception of a desired high frequency signal as may be used in a base station radio equipment for mobile communication system, for example, and a high frequency receiver unit for use in such a receiver system.

PRIOR ART

For a base station of a mobile communication system which includes a plurality of sectors, space diversity reception technique is employed for each sector in order to attain high sensitive reception of the signal transmitted from a mobile station. In this instance, the transmitted signal from the mobile station is received by the plurality of antennae, and in order to achieve high C/N(carrier to noise ratio) characteristics, the received high frequency (hereafter h.f.) signals from the antennae in each sector are processed by the bandpass filters of predetermined characteristics which are cooled with extremely low temperature, and one of the filter outputs which exhibits a highest level is selected for demodulation by an associated receiver.

If the cooling function applied to these bandpass filters ceases to operate and allows the temperature to rise, thermal noises generated within the bandpass filters increase, and there results a degradation in the noise figure which has been kept improved by the cooling function, leading to a degradation in the received signal or a failure of reception. In particular, when the bandpass filters are composed of superconducting bandpass filters, a fault in the cooling unit results in not only a degradation of the noise figure, but also a problem that the reception is disabled in all the sectors. This is because the superconducting bandpass filters cannot be maintained in the superconducting state after exceeding the critical temperature. This problem is quite remarkable when the bandpass filters connected to the plural antennae in each sector are cooled in a single vacuum chamber (heat shielding box) to reduce the total number of the cooling units corresponding to the sectors for economic purpose. However, a failure in one of these cooling units disables the reception of the corresponding sector, even though the cooling unit is provided separately for each sector.

An arrangement which overcomes this problem is disclosed in U.S. Pat. No. 5,828,944, and is illustrated in FIG. 1. As shown, two antennae are arranged in each of three sectors and three vacuum chambers $8_1, 8_2, 8_3$. Each chamber contains a pair of superconducting bandpass filters. Antennae $1_1, 1_2$ of sector SC1 are connected to bandpass filters $3_1, 3_2$ contained in different chambers $8_1, 8_3$; antennae $1_3, 1_4$ of sector SC2 are connected to bandpass filters $3_3, 3_4$ contained in different chambers $8_1, 8_2$; and antennae $1_5, 1_6$ of sector SC3 are connected to bandpass filters $3_5, 3_6$ contained in different chambers $8_2, 8_3$. Outputs from the bandpass filters $3_1, 3_2$ are connected to a diversity receiver $9_1$, outputs from the bandpass filters $3_3, 3_4$ are connected to a diversity receiver $9_2$, outputs from the bandpass filters $3_5, 3_6$ are connected to a diversity receiver $9_3$.

With this arrangement, if a failure occurs with the chamber $8_1$ which contains the bandpass filter $3_1, 3_3$ for sectors SC1 and SC2, for example, the diversity effect is no longer available, but the reception in these sectors are not disabled because the remaining bandpass filters $3_2, 3_4$ for these sectors are contained in the chambers $8_3, 8_2$, respectively. According to this patent, received h.f. signals are processed by superconducting bandpass filters $3_1$ to $3_6$, the outputs of which are directly led out of the chambers to be input to the diversity receivers $9_1, 9_2, 9_3$, for amplification, and accordingly, C/N of received h.f. signals is degraded due to thermal noises generated during the amplification.

In a high sensitive radio receiver system employing superconducting bandpass filters, an extremely high-reliable cooling unit is used because the filter performance is degraded rapidly if the temperature to which the superconducting bandpass filters are cooled exceeds a critical temperature to render them non-superconducting. However, there remains a problem that the reception by the high sensitive radio receiver system may be disabled by a rapid degradation in the performance of superconducting bandpass filters as a result of an aging effect of the cooling unit or a rise in the cooling temperature upon occurrence of a failure. This is because even an extremely high-reliable cooling unit cannot be free from a failure.

It is an object of the present invention to provide a high sensitive radio receiver system which has an excellent noise figure and which is operable even when one of a plurality of cooling units fails. It is another object of the present invention to provide a high frequency unit for use in the high sensitive radio receiver system which is capable of delivering a received h.f. signal even if a fault occurs with the cooling of a superconducting bandpass filter.

DISCLOSURE OF THE INVENTION

A high sensitive radio receiver system for receiving signals from at least two antennae provided in each of a plurality of sectors according to the present invention comprises;

a plurality of vacuum chambers;

a plurality of cooling units each cooling the interior of each of the plurality of vacuum chambers;

a plurality of bandpass filters each contained in one of the vacuum chambers for deriving a received h.f. signal in a predetermined frequency band, said at least two antennae of each sector being connected to the bandpass filters contained in different ones of the plurality of vacuum chambers; and a low noise amplifiers each contained in corresponding one of said vacuum chambers and connected in series with a corresponding one of the plurality of bandpass filters for amplifying and delivering the received h.f. signal;

wherein a combination of each series connection of the bandpass filter and the low noise amplifier, a vacuum chamber which contains the series connection and the cooling unit which cools the series connection forms a high frequency reciever unit.

A high frequency receiver unit according to the present invention comprises:

a vacuum chamber;

a cooling unit for cooling the interior of the vacuum chamber;

a first signal path contained within the vacuum chamber and including a series connection of a superconducting bandpass filter which operates in a superconducting state at or below a critical temperature and a low noise amplifier for passing a received h.f. signal therethorough; and a second signal path including a normal conducting bandpass filter operative at least at or above the critical temperature of the superconducting bandpass filter and having substantially the same passband as the superconducting bandpass filter, for delivering the received h.f. signal by bypassing the first signal path whenever the superconducting bandpass filter is not in a superconducting state.

BEST MODE OF CARRYING OUT THE INVENTION

First Embodiment

Figure 2:
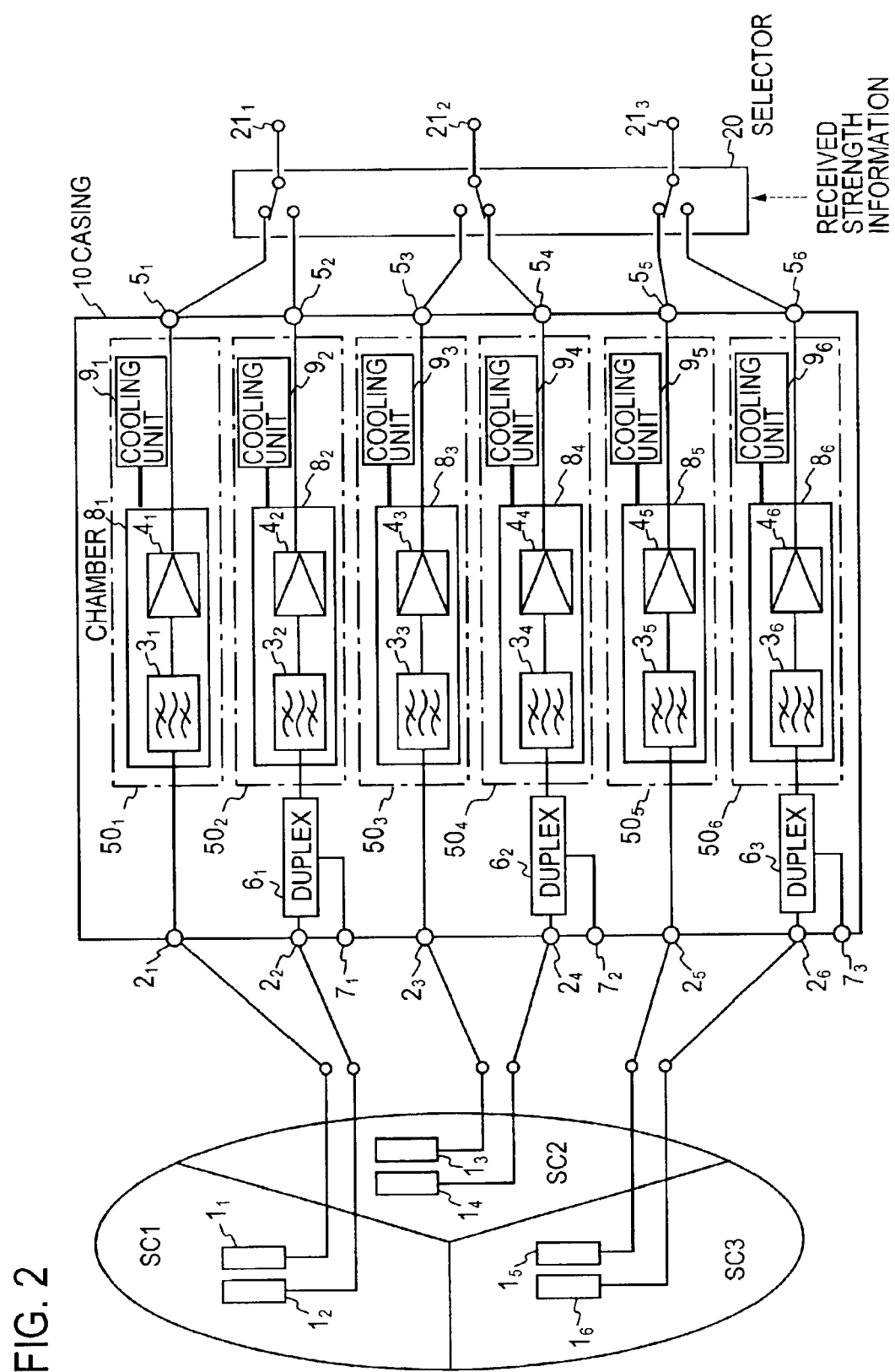
FIG. 2 is a block diagram illustrating an example of a first embodiment of a high sensitive radio receiver system according to the present invention.

An embodiment of the invention for a conventional high sensitive radio receiver system is shown in FIG. 2 where three sectors are used.

In a mobile communication in which the high sensitive radio receiver system is used, a signal is received by applying the space diversity technique using two antennae per sector. In the example shown in FIG. 2, one of the two antennae is shared for transmission and reception. The high sensitive radio receiver system comprises an antenna terminal $2_1$ to which a received signal from an antenna $1_1$ of sector SC1 is input, a bandpass filter $3_1$ which selects a signal in a desired band from the received h.f. signal input from an antenna terminal $2_1$, a low noise amplifier $4_1$ for amplifying an output from a bandpass filter $3_1$ with a low noise response, and an output terminal $5_1$ which delivers the received h.f. signal that is amplified by the low noise amplifier $4_1$. The high sensitive radio receiver system is often installed outdoors or in the vicinity of the top of an antenna tower in order to reduce a feeder loss from antenna $1_1$ to antenna terminal $2_1$.

The receiver system also comprises an antenna terminal $2_2$ to which a received h.f. signal from an antenna $1_2$ is input, a bandpass filter $3_2$ for selecting a signal in a desired band from the received h.f. signal which is provided from the antenna terminal $2_2$, an antenna duplexer $6_1$ which allows the common antenna $1_2$ to be shared between the transmission and the reception, a low noise amplifier $4_2$ for amplifying an output from the bandpass filter $3_2$ to a desired level with a low noise response, and an output terminal $5_2$ for delivering the received h.f. signal which is amplified by the low noise amplifier $4_2$. The antenna duplexer $6_1$ has an input terminal $7_1$ to which a transmitting h.f. signal is input.

As one of diversity reception techniques, selection combining is performed by a selector 20 which selects one of the received h.f. signals from the output terminals $5_1$ and $5_2$ on the basis of the received strength information so that a signal which exhibits a higher sensitivity is selected to be delivered through a selector output terminal $22_1$.

In the similar manner as mentioned above in connection with the sector SC1, the receiver system also comprises antennae $1_3$ and $1_4$, antennae terminals $2_3$ and $2_4$, bandpass filters $3_3$ and $3_4$, an antenna duplexer $6_2$, low noise amplifier $4_3$ and $4_4$, output terminals $5_3$ and $5_4$ and an input terminal $7_2$ for the sector SC2 and also comprises antennae $1_5$ and $1_6$, antenna terminals $2_5$ and $2_6$, bandpass filters $3_5$ and $3_6$, an antenna duplexer $6_3$, low noise amplifier $4_5$ and $4_6$, output terminals $5_5$ and $5_6$ and an input terminal $7_3$ for the sector SC3.

For each of the sectors SC2 and SC3, one of the received h.f. signals from the pair of output terminals $5_3$ and $5_4$ or $5_5$ and $5_6$ is selected by the selector 20 to be delivered through a selector output terminal $21_2$ or $21_3$.

In this embodiment, a series connection of the bandpass filter $3_1$ and the low noise amplifier $4_1$ is confined in a vacuum chamber $8_1$ to be thermally insulated from the exterior and is cooled by a cooling unit $9_1$. The bandpass filter $3_1$, the low noise amplifier $4_1$, the vacuum chamber $8_1$ and the cooling unit $9_1$ form in combination a high frequency receiver unit $50_1$. A series connection of the bandpass filter $3_2$ and the low noise amplifier $4_2$ is also contained in a vacuum chamber $8_2$ and is cooled by a cooling unit $9_2$. The bandpass filter $3_2$, the low noise amplifier $4_2$, the vacuum chamber $8_2$ and the cooling unit $9_2$ form in combination a high frequency receiver unit $50_2$. In the similar manner, a series connection of each of the bandpass filters $3_3$ to $3_6$ and corresponding one of the low noise amplifiers $4_3$ to $4_6$ is contained in corresponding one of vacuum chambers $8_3$ to $8_6$, and is cooled by corresponding one of cooling units $9_3$ to $9_6$, respectively, thus forming high frequency receiver units $50_3$ to $50_6$. Antenna duplexers $6_1$ to $6_3$ and the high frequency receiver units $50_1$ to $50_6$ are housed in a casing 10.

While not shown, the low noise amplifiers $4_1$ to $4_6$ and the cooling units $9_1$ to $9_6$ are fed with an operating power.

Figure 3:
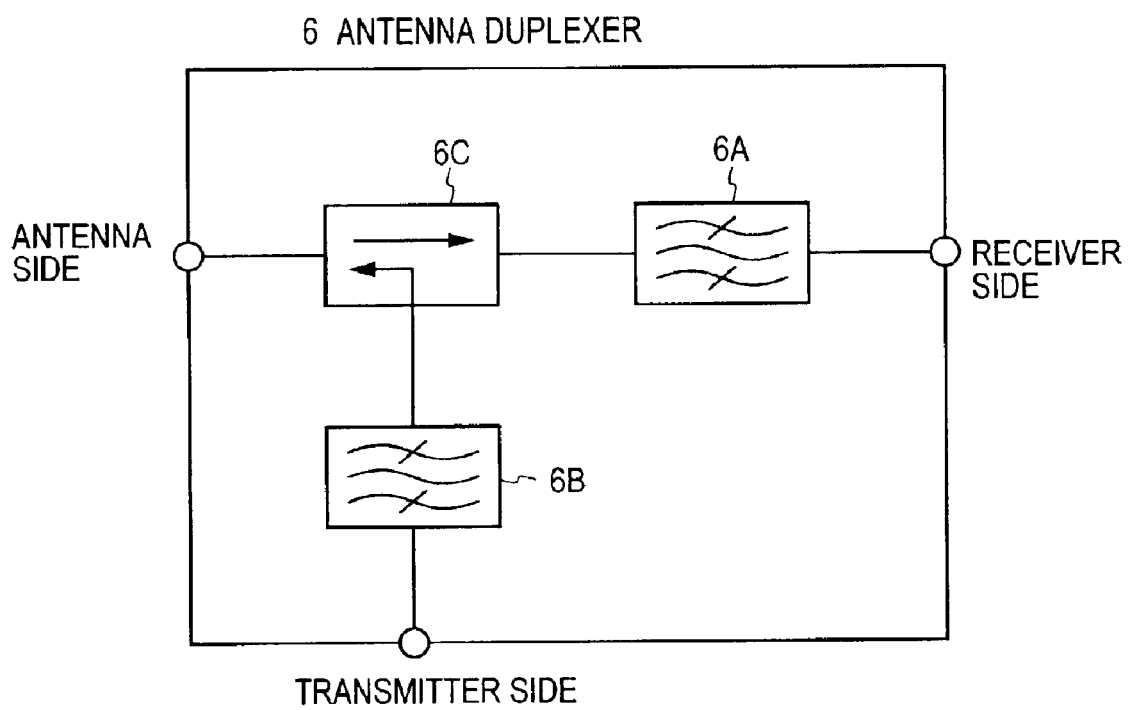
FIG. 3 is a block diagram illustrating an example of an antenna duplexer.

One of the antenna duplexers $6_1$ to $6_3$ is illustrated in FIG. 3, and comprises a directional filter. Specifically, in the example shown, the directional filter comprises a bandpass filter 6A which passes a received h.f. signal from an antenna to a receiver side, a bandpass filter 6B which passes a transmitted h.f. signal from a transmitter side to the antenna, and a directional coupler 6C for coupling one ends of the both filters to the antenna side. The receiver h.f. signal from the antenna side is blocked by the bandpass filter 6B from being transmitted to the transmitter side while the transmitted h.f. signal from the transmitter side is blocked by the bandpass filter 6A from being transmitted to the receiver side. In this manner, both the transmitter and receiver circuits can be connected to a single antenna.

Each of the vacuum chambers $8_1$ to $8_6$ is constructed to interrupt a heat flow from the exterior by vacuum heat insulation, for example, and accordingly, the bandpass filters $3_1$ to $3_6$ and the low noise amplifiers $4_1$ to $4_6$ which are confined in the vacuum chambers $8_1$ to $8_6$ are cooled by the cooling units $9_1$ to $9_6$ to an extremely low temperature on the order of several tens K in a stable manner for prolonged period of time. Each of the cooling units $9_1$ to $9_6$ comprises a cryogenic refrigerator capable of maintaining an extremely low temperature such as tens K in a stable manner for a prolonged period of time by utilizing a heat exchange cycle through the compression and the expansion of a helium gas or the like, and commercially available products may be used at this end.

When the bandpass filters $3_1$ to $3_6$ and the low noise amplifiers $4_1$ to $4_6$ are cooled in this manner to a extremely low temperature in stable manner and for a prolonged period of time, thermal noises which may be added in the bandpass filters $3_1$ to $3_6$ and the low noise amplifiers $4_1$ to $4_6$ can be reduced ultimately. Consequently, when the high sensitive radio receiver system shown in FIG. 2 is used, a received output of a given C/N(Carrier power/Noise power) can be obtained from a low level received signal and also it is possible to reduce the transmission power required at the transmitting side to allow reception of signal with the given C/N at the receiving side.

In the present embodiment, the series connection of the bandpass filter $3_i$ and the low noise amplifier $4_i$ which corresponds to each antenna is cooled by the cooling unit $9_i$ (i=1, 2, . . . , 6) which is provided separately. As a result, for each sector, it is assured that if either one of the two cooling units which correspond to the two antennae of the sector fails and prevents the bandpass filter and the low noise amplifier disposed in that path from being cooled, the combination of the bandpass filter and the low noise amplifier in the other path is capable of deriving a received h.f. signal.

Second Embodiment

Figure 4:
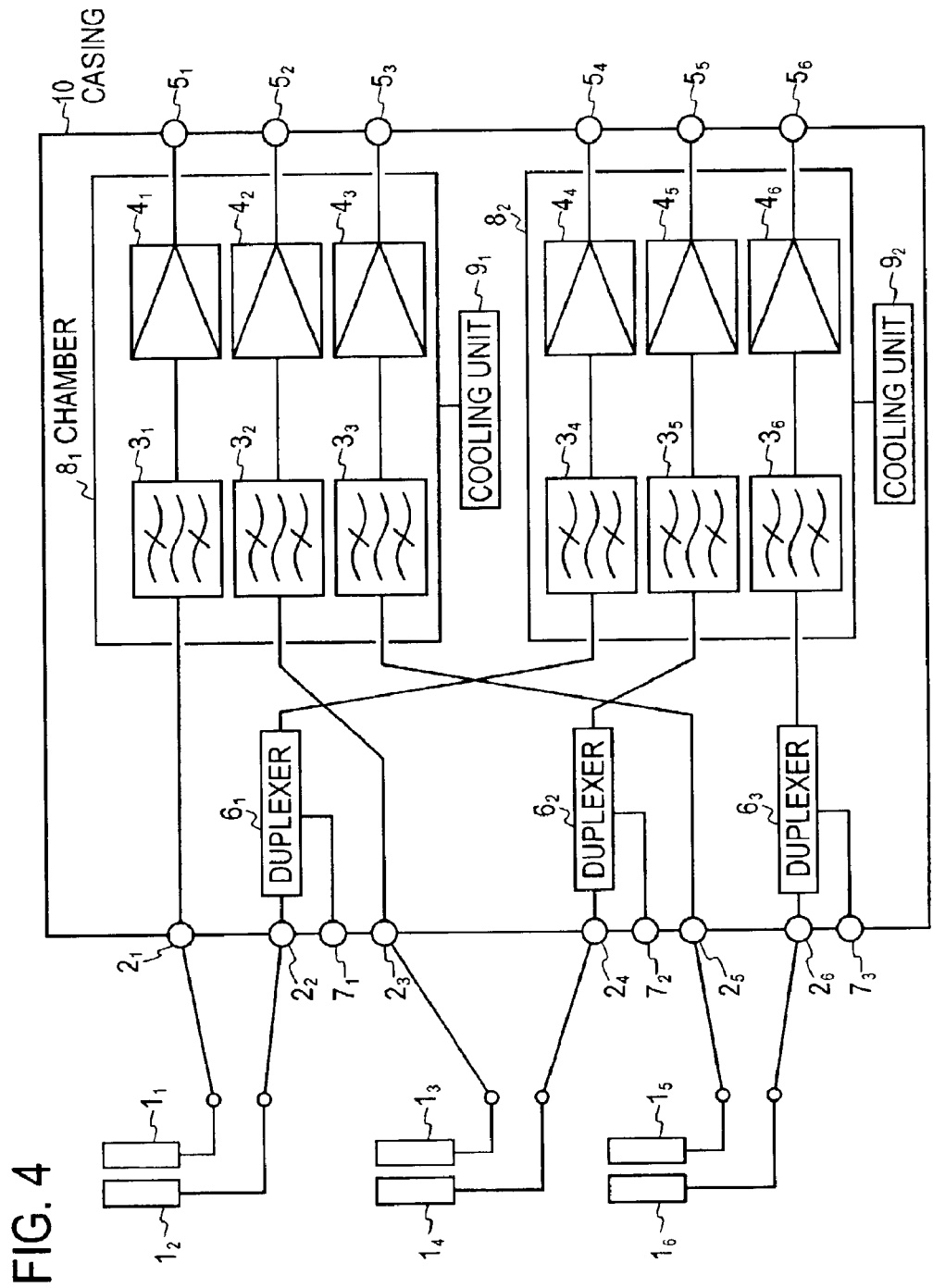
FIG. 4 is a block diagram illustrating a second embodiment of the present invention.

FIG. 4 shows a second embodiment of the high sensitive radio receiver system according to the present invention. In this embodiment, two vacuum chambers $8_1$, $8_2$ are disposed in the casing 10. The vacuum chamber $8_1$ contains superconducting bandpass filters $3_1$, $3_2$, $3_3$ and low noise amplifiers $4_1$, $4_2$, $4_3$ which are connected to the filter outputs. The vacuum chamber $8_2$ contains superconducting bandpass filters $3_4$, $3_5$, $3_6$ and low noise amplifiers $4_4$, $4_5$, $4_6$ which are connected to the filter outputs. Outputs from the low noise amplifiers $4_1$ to $4_3$ and $4_4$ to $4_6$ are connected through output terminals $5_1$ to $5_3$ and $5_4$ to $5_6$ selectively to the three diversity amplifiers which are located outside the casing 10 though not shown in FIG. 4. The interior of vacuum chambers $8_1$ and $8_2$ is cooled by cooling unit $9_1$ and $9_2$, respectively. In this embodiment, three sets of the bandpass filters $3_1$ to $3_3$ and the low noise amplifiers $4_1$ to $4_3$ which are connected in series, the vacuum chamber $8_1$ and the cooling unit $9_1$ constitute three high frequency receiver units while utilizing the vacuum chamber $8_1$ and the cooling unit $9_1$ in common. Similarly, three sets of the bandpass filters $3_4$ to $3_6$ and the low noise amplifiers $4_4$ to $4_6$ which are connected in series, the vacuum chamber $8_2$ and the cooling unit $9_2$ constitute three high frequency receiver units while utilizing the vacuum chamber $8_2$ and the cooling unit $9_2$ in common.

Received h.f. signals from the two antennae $1_1$ and $1_2$ of a first sector are applied to antenna terminals $2_1$ and $2_2$, respectively, and thence input, one directly and the other through an antenna duplexer $6_1$, to the bandpass filters $3_1$ and $3_4$ which are contained in different vacuum chambers $8_1$ and $8_2$, respectively.

The same applies to the second sector. A received h.f. signal from an antenna $1_3$ is supplied through an antenna terminal $2_3$ to the bandpass filter $3_2$ which is contained in one of the vacuum chambers, $8_1$, while an antenna $1_4$ is connected through an antenna terminal $2_4$ and an antenna duplexer $6_2$ to the bandpass filter $3_5$ contained in the other vacuum chamber $8_2$. The same applies to the third sector where a received h.f. signals from an antenna $1_5$ is supplied through an antenna terminal $2_5$ to the bandpass filter $3_3$ which is contained in one vacuum chamber $8_1$ while an antenna $1_6$ is connected through an antenna terminal $2_6$ and an antenna duplexer $6_3$ to the bandpass filter $3_6$ contained in the other vacuum chamber $8_2$.

In this manner, in the second embodiment, the high frequency receiver units are divided into one set including the bandpass filters $3_1$ to $3_3$ and the low noise amplifiers $4_1$ to $4_3$ and another set including the bandpass filters $3_4$ to $3_6$ and the low noise amplifiers $4_4$ to $4_6$. The bandpass filters $3_1$ to $3_3$ and the low noise amplifiers $4_1$ to $4_3$ are confined in the vacuum chamber $8_1$ and are cooled by the cooling unit $9_1$ while the bandpass filters $3_4$ to $3_6$ and the low noise amplifiers $4_4$ to $4_6$ are confined in the vacuum chamber $8_2$ and cooled by the cooling unit $9_2$. In this manner, two receiving paths, each comprising the bandpass filter and the low noise amplifier, of the same sector are cooled by separate cooling units.

Figure 1:
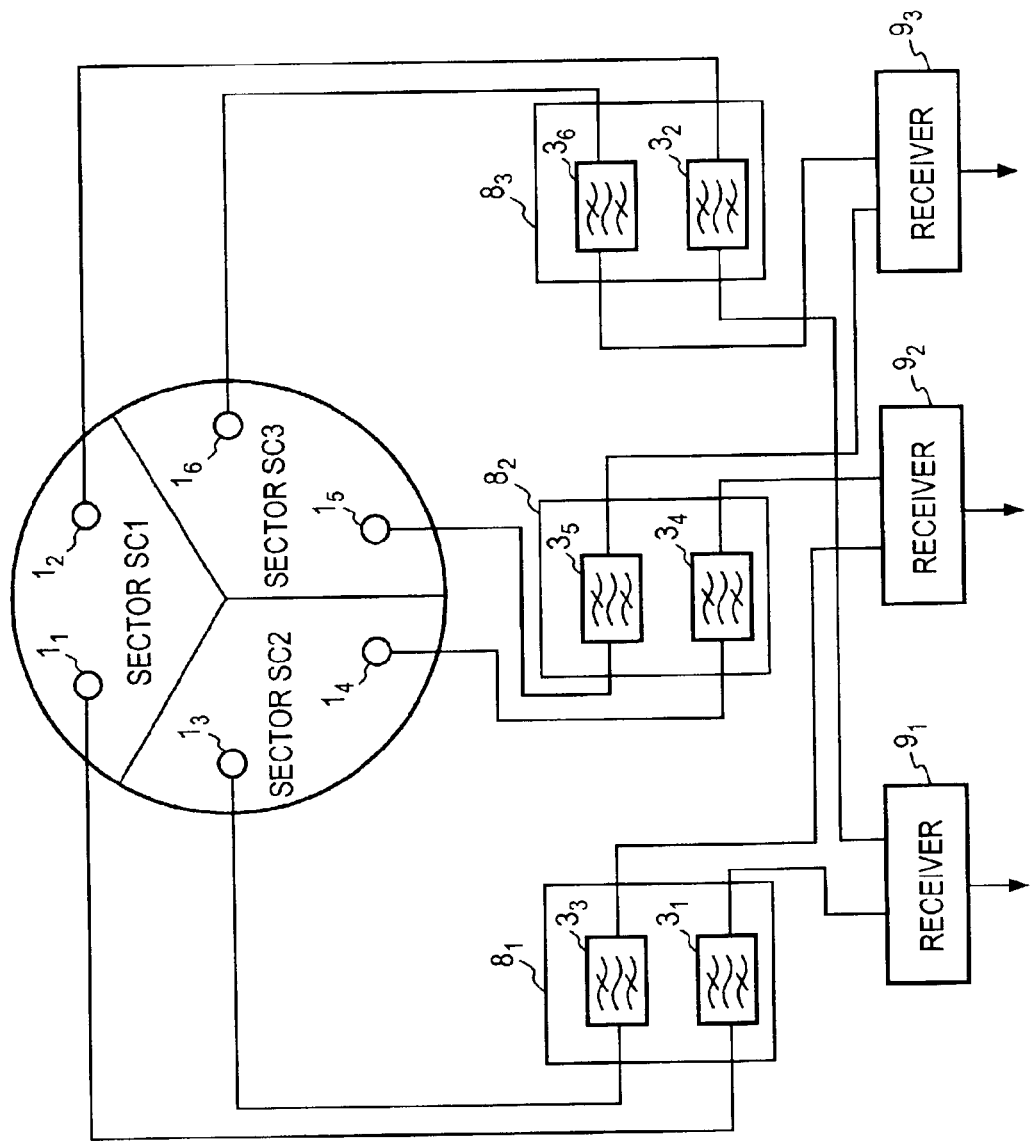
FIG. 1 is a block diagram illustrating an example of prior art high sensitive radio receiver system.

The connection of two antennae of each sector to the bandpass filters which are contained in different vacuum chambers $8_1$ and $8_2$ is merely exemplified in FIG. 4. Alternatively, the connection between the antenna terminals $2_1$ and $2_2$ and the bandpass filters $3_1$ and $3_4$ shown in FIG. 4 may be interchanged, and the connection between the antenna terminals $2_3$ and $2_4$ and the bandpass filters $3_2$ and $3_5$ may also be interchanged. Four different combinations of different connections are possible. With such a connection, if a fault occurs in either the cooling unit $9_1$ or $9_2$ to disable the cooling function in a similar manner as in the prior art illustrated in FIG. 1, at least one path of each sector is not influenced, thus avoiding a degraded reception or an inability of reception of all the sectors. As before, in this embodiment, each bandpass filter and its connected low noise amplifier are contained in a vacuum chamber to be cooled, resulting in the addition of thermal noises in the amplifier to be drastically reduced, allowing a received h.f. signal of a high quality to be obtained.

Third Embodiment

Figure 5:
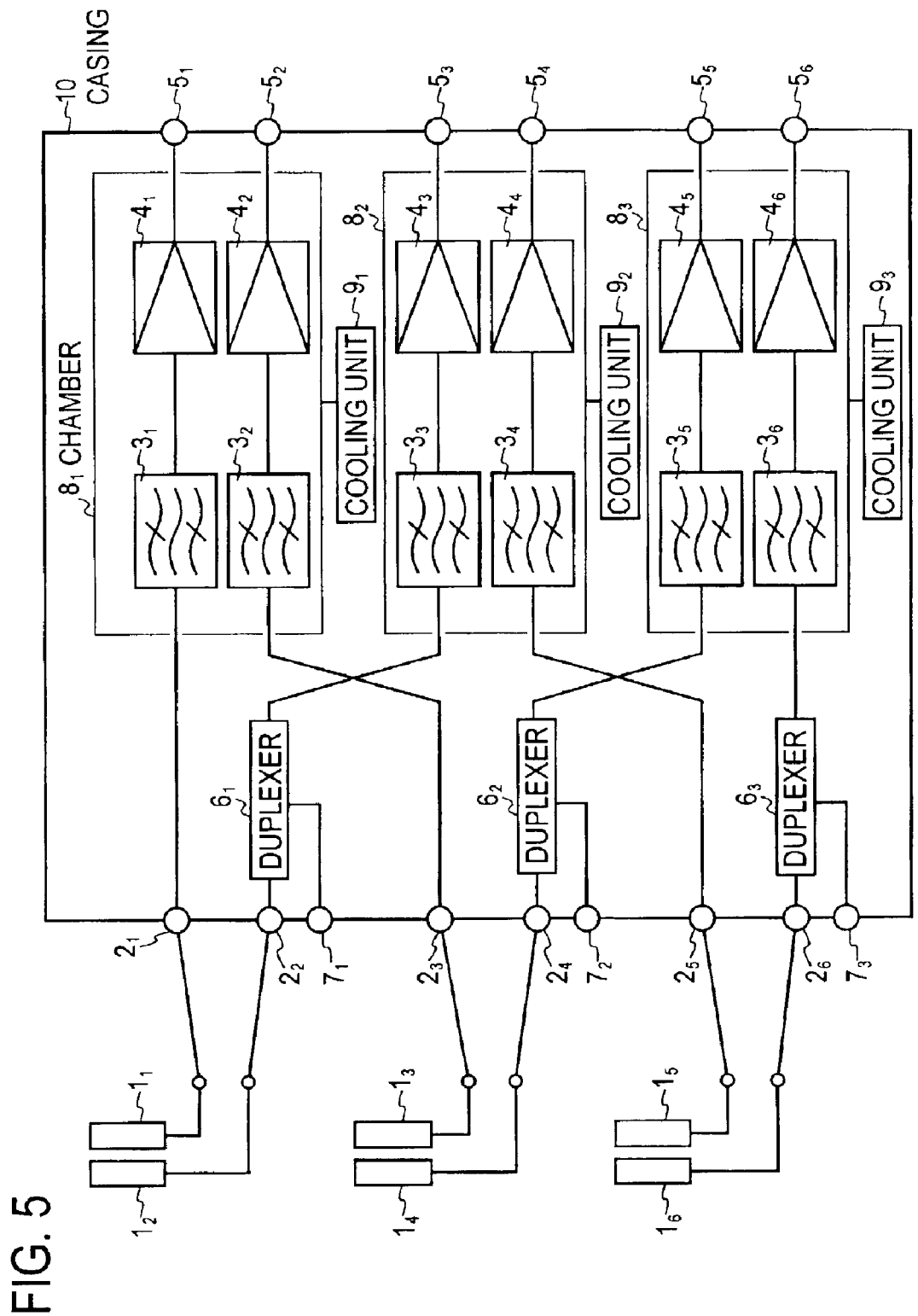
FIG. 5 is a block diagram illustrating a third embodiment of the present invention.

FIG. 5 shows a third embodiment of the high sensitive radio receiver system according to the present invention. In this embodiment, three vacuum chambers $8_1$, $8_2$, $8_3$ and associated cooling units $9_1$, $9_2$, $9_3$ are disposed in a casing 10, respectively. Two antennae of each sector are connected to different bandpass filters which are contained in two of the three vacuum chambers $8_1$, $8_2$, $8_3$, in a similar manner as in the prior art shown in FIG. 1. The vacuum chamber $8_1$ contains bandpass filters $3_1$, $3_2$ and low noise amplifiers $4_1$, $4_2$ connected thereto; the vacuum chamber $8_2$ contains bandpass filters $3_3$, $3_4$ and low noise amplifiers $4_3$, $4_4$ connected thereto; and the vacuum chamber 8 contains bandpass filters $3_5$, $3_6$ and their connected low noise amplifiers $4_5$, $4_6$ connected thereto.

In this embodiment, two sets of bandpass filters $3_1$, $3_2$ and the low noise amplifiers $4_1$, $4_2$ which are connected in series, the vacuum chamber $8_1$ and the cooling unit $9_1$ form two high frequency receiver units while sharing the vacuum chamber $8_1$ and the cooling unit $9_1$. Similarly, two sets of bandpass filters $3_3$, $3_4$ and the low noise amplifier $4_3$,$4_4$ which are connected in series, the vacuum chamber $8_2$ and the cooling unit $9_2$ form two high frequency receiver units while sharing the vacuum chamber $8_2$ and the cooling unit $9_2$. Two sets of bandpass filters $3_5$, $3_6$ and the low noise amplifiers $4_5$, $4_6$ which are connected in series, the vacuum chamber $8_3$ and the cooling unit $9_3$ form two high frequency units while sharing the vacuum chamber $8_3$ and the cooling unit $9_3$.

The connection between the antenna terminals $2_1$ to $2_6$ and the bandpass filters $3_1$ to $3_6$ shown in FIG. 5 is merely an example, and there are eight ways of connecting to the antennae of each sector to the bandpass filters which are contained in different two of the three vacuum chambers.

With this connection, even if a fault occurs with either one of the cooling units $9_1$, $9_2$ and $9_3$ to disable the cooling function, at least one path of each sector is not influenced, thus avoiding a degraded reception or an inability of reception of all the sectors, in a similar manner as in the embodiments shown in FIGS. 2 and 4.

A three-sector arrangement has been mentioned above, but a high sensitive radio receiver system can be constructed with a different sector arrangement. For example, a six-sector arrangement can be constructed in entirely the same manner as for the three-sector arrangement. For example, for the six-sector arrangement, twelve antennae are required. The connection between the twelve antennae to the series connections, each comprising the bandpass filter and the low noise amplifier, of all the paths may be contemplated as follows:

(1) A set of a vacuum chamber and a cooling unit may be provided for each path as in the embodiment shown in FIG. 2;

(2) two sets of vacuum chambers and cooling units may be provided as in the embodiment shown in FIG. 4, each set contains six paths each comprising a series connection of a bandpass filter and a low noise amplifier;

(3) three sets of vacuum chambers and cooling units may be provided as in the embodiment shown in FIG. 5, each set contains four paths each comprising a series connection of a bandpass filter and a low noise amplifier;

(4) while not shown in the drawings, four sets of vacuum chambers and cooling units may be provided, each set containing three paths each comprising a series connection of a bandpass filter and a low noise amplifier; or (5) six sets of vacuum chambers and cooling units may be provided, each set containing two paths each comprising a series connection of a bandpass filter and a low noise amplifier.

What is required in each instance is to avoid that series connections of bandpass filters and low noise amplifiers representing two paths for one sector are confined in a common vacuum chamber to be cooled by a common cooling unit. Obviously, if a compact cooling unit of a low power consumption is available, a vacuum chamber and a cooling unit may be provided for each of the twelve paths.

In the described embodiments, one of two antennae for a sector is used as one which is shared for the transmission and the reception while the other antenna is used exclusively for the reception. However, alternatively, three or more antennae may be provided for one sector, one of the antennae may be shared for the transmission and the reception while the remaining two antennae may by used for the reception. As a further alternative, all the antennae may be used for the reception, thus avoiding the use of antenna duplexers.

In the described embodiments, each of the bandpass filters $3_1$ to $3_6$ may comprise a microstrip line, for example. A ground layer and a signal line are formed by superconducting material so that a loss of a resulting bandpass filter can be substantially reduced, allowing a significant improvement of the noise figure of the receiver, and accordingly, significant improvement of the sensitivity of the receiver.

Copper oxide superconductors containing Bismuth (Bi), Thallium (Tl), Lead (Pb) or Yttrium (Y), for example, are known as high temperature superconductors, and can be used as the superconducting material for the purpose of the present invention. Some high temperature superconductors have a critical temperature exceeding 100 K below which the superconducting state is achieved. When such superconductor is used, the superconducting state is achieved by merely cooling to the order of 77.4 K which is the boiling point of the liquid nitrogen, thus alleviating the cooling capability of unit 9 and permitting a compact and inexpensive cryogenic refrigerator to be used. As a result, a high sensitive radio receiver system can be constructed in a compact manner and inexpensively.

However, even if the bandpass filter is formed by a normally conducting (non-superconducting) material, the noise figure can be improved by the refrigeration.

Fourth Embodiment

The above described embodiment provides an improvement so that even when one of the cooling units fails, not all of the receiver units for the corresponding sectors become disabled. Now, another embodiment of a high frequency receiver unit will be described, which enables the reception along a path formed by each set of a bandpass filter and a low noise amplifier being cooled even if a cooling unit fails.

Figure 6:
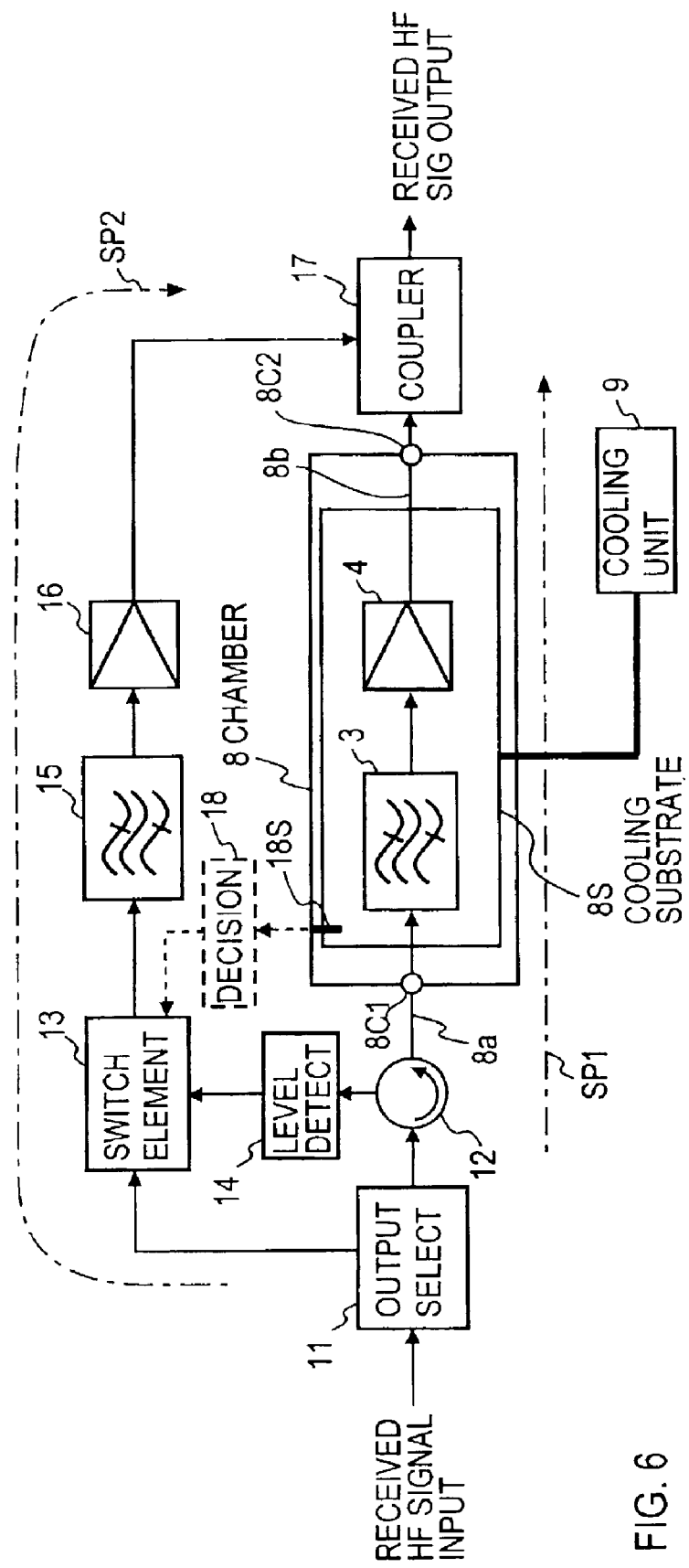
FIG. 6 is a block diagram illustrating an embodiment of a high frequency receiver unit according to the present invention.

An embodiment shown in FIG. 6 is arranged such that when the temperature within a vacuum chamber 8 such as any one of the vacuum chambers $8_1$ to $8_6$ shown in FIG. 2, for example, has exceeded the critical temperature for reason of some fault, a bandpass filtering and an amplification required for an input received h.f. signal can be assured through a bypass path.

A high frequency receiver unit of this embodiment comprises a superconducting bandpass filter 3 which selects a signal in a desired band from a received h.f. signal which is input through a coaxial cable 8a and a coaxial connector 8C1, a low noise amplifier 4 which amplifies an output from the bandpass filter 3 to a desired level with a low noise response, a coaxial cable 8b and a coaxial connector 8C2 which deliver the received h.f. signal that is amplified by the low noise amplifier 4. This signal path is referred to as a first signal path SP1. The superconducting bandpass filter 3 and the low noise amplifier 4 are secured to a cooling substrate 8S within the vacuum chamber 8 in close contact therewith, and the cooling substrate 8S is cooled by a cooling unit 9.

In addition, in this embodiment, an output selection circuit 11 and a coupler 17 are connected to the input side and the output side of a series connection of the bandpass filter 3 and the low noise amplifier 4, respectively, and there is provided a second received signal path SP2 which extends from the output selection circuit 11 to the coupler 17 through a series connection of a switch element 13, a normal conducting bandpass filter 15 and a low noise amplifier 16.

The output selection circuit 11 determines which one of the first signal path SP1 passing through a series connection of the superconducting bandpass filter 3 and the low noise amplifier 4 and the second signal path SP2 passing through a series connection of the normal conducting bandpass filter 15 and the low noise amplifier 16 is to be selected, and a received h.f. signal is transmitted thorough the selected signal path. The normal conducting bandpass filter 15 has a passband which is substantially the same as that of the superconducting bandpass filter 3. The outputs of the first and the second signal paths SP1, SP2 are coupled with coupler 17, whereby a signal from the signal path which is selected by the output selection circuit 11 is delivered.

A circulator 12 is connected in the first signal path SP1 between the output selection circuit 11 and the coaxial connector 8C1, and the received h.f. signal from the output selection circuit 11 passes through the circulator 12 to be directly fed to the coaxial connector 8C1. If the temperature of the cooling substrate 8S exceeds the critical point to cause a change in the impedance of the bandpass filter 3 to thereby produce an impedance mismatch with the coaxial cable 8C1, the received h.f. signal input to the bandpass filter 3 is reflected to pass through the circulator 12 to be fed to a level detector 14. If the level detector 14 detects a reflected wave equal to or above a predetermined level, it turns the switch element 13 on, thus rendering the second signal path SP2 conductive.

Figure 7:
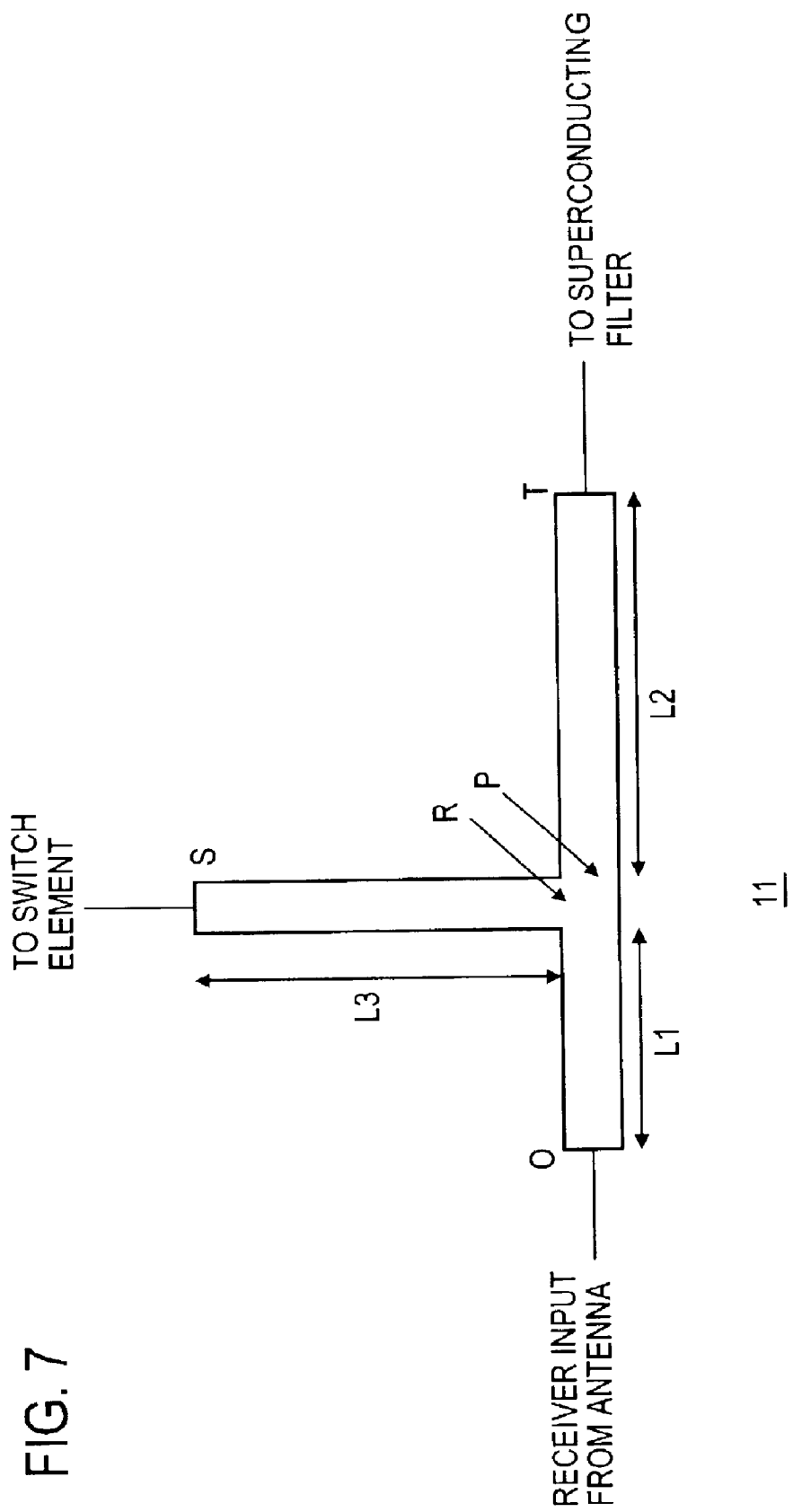
FIG. 7 is a schematic illustration of an output selection circuit shown in FIG. 6.

FIG. 7 shows an example of the output selection circuit 11, which comprises a T-shaped microstrip line. Point O represents an input end for received signal, point S is connected to the switch element 13, and point T is connected to the input of the superconducting bandpass filter 3. L1, L2 and L3 in FIG. 7 represent line lengths to the branch point, respectively. Although L1 is to be determined depending on the peripheral settings, L1 is desirable to be chosen as short as possible in view of reducing the signal loss.

Figure 8:
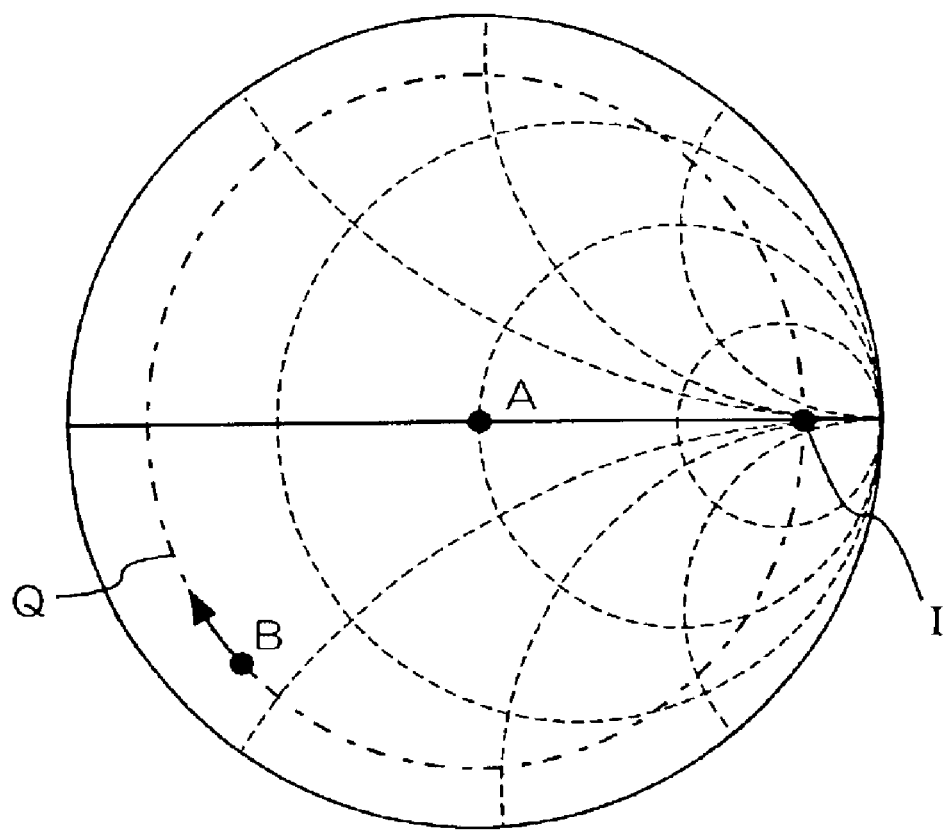
FIG. 8 is a Smith chart representing an example of input impedance when a bandpass filter 3 is in its superconducting state and non-superconducting state.

The line length L2 and L3 are determined as follows: FIG. 8 shows an example of the input impedance of the superconducting bandpass filter 3 on a Smith chart. Point A indicates the impedance when the superconducting bandpass filter 3 is in its superconducting state and is matched to the characteristic impedance of coaxial cable 8a. If the superconducting bandpass filter 3 is not in its superconducting state, the impedance of the superconducting bandpass filter 3 transfers to point B, thereby producing an impedance mismatch with the coaxial cable 8a. When the bandpass filter 3 is in its superconducting state, it is necessary that the signal be transmitted to point T shown in FIG. 7 without transferring it to point S. The signal transfer in a direction toward point S is blocked by turning the switch element 13 off to produce an impedance mismatch for point S and choosing L3 so that an impedance at point R is infinity.

Figure 9:
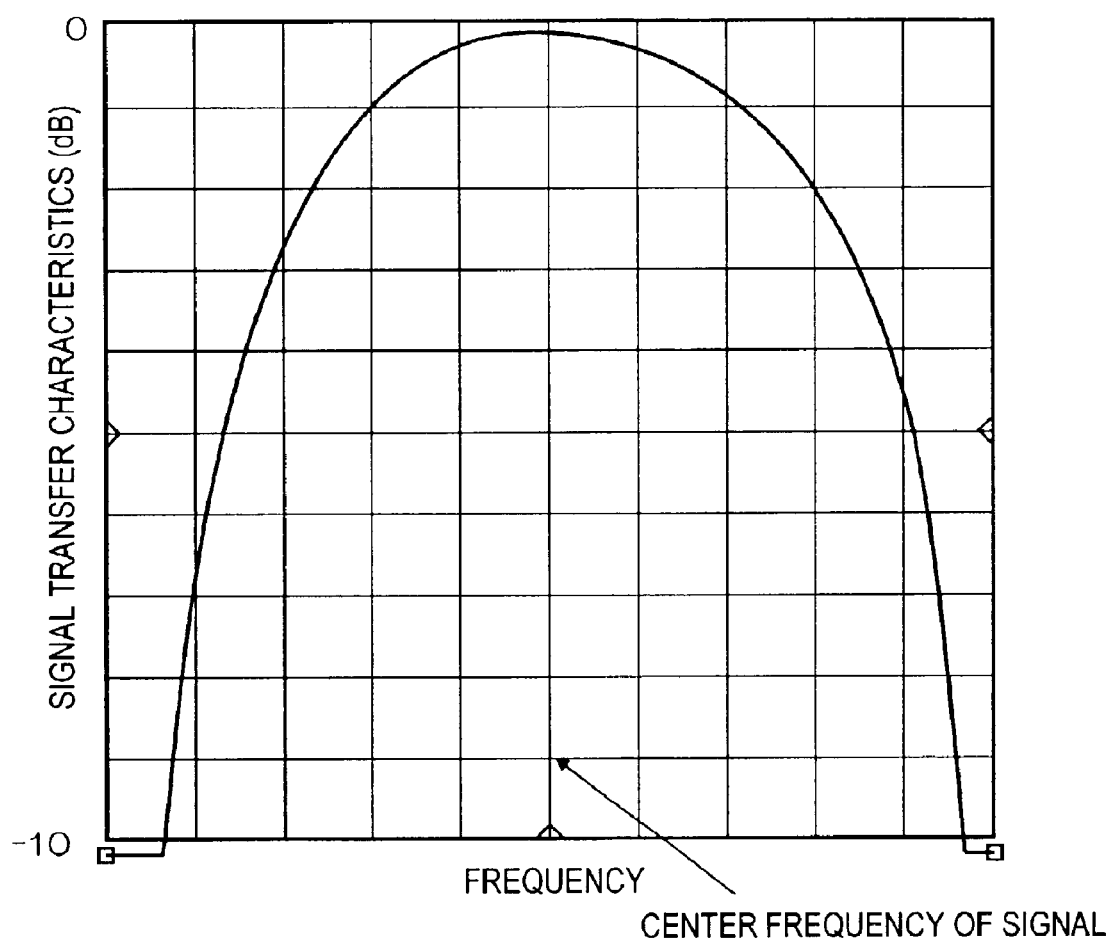
FIG. 9 graphically shows signal transfer characteristics from point O to point T of an output selection circuit when the bandpass filter 3 is in its superconducting state.

FIG. 9 shows signal transfer characteristics from point O to point T shown in FIG. 7 when the bandpass filter 3 is in its superconducting state. The abscissa represents the frequency and the center frequency of the input h.f. signal is located at the center of the abscissa. The ordinate represents the transfer characteristics where 0 dB stands for a no loss transmission while −10 dB indicates a signal attenuation by a factor of ten. In this manner, in the superconducting state, an efficient signal transfer is possible from point O to point T, that is, from the input end to the output end of the superconducting bandpass filter 3.

On the other hand, if the superconducting bandpass filter 3 is not in its superconducting state, it is necessary to set the impedance at point P as close to infinity as possible in order to transfer the signal to point S in FIG. 7 without being fed to the superconducting bandpass filter 3. Accordingly, the parameter L2 is determined so that the impedance at point P in FIG. 7 be set as closed to the infinity as possible on the basis of point B in FIG. 8. It is to be understood that at this time, the impedance matching is achieved at point S in FIG. 7 by turning the switch element 13 on.

Assuming that the characteristic impedance of the line L2 is equal to that of a succeeding superconducting bandpass filter 3, the locus of the impedance at point P in FIG. 7 depicts a circle Q which passes through point B in FIG. 8 as the line length L2 is changed from 0 to $\alpha/2$. Here, $\alpha$ represents the wavelength of the center frequency of the signal transferred on the output selection circuit 11. In the actual design of the line length L2, the characteristic impedance of the line from point P to point T shown in FIG. 8 is chosen to be equal to that of the superconducting bandpass filter 3 when the superconducting bandpass filter 3 is in its superconducting state. Point I indicates the point where the impedance at point P is most close to infinity on the circle Q. The line length L2 is designed so that the impedance at point P in FIG. 7 is set to point I shown in FIG. 8.

Figure 10:
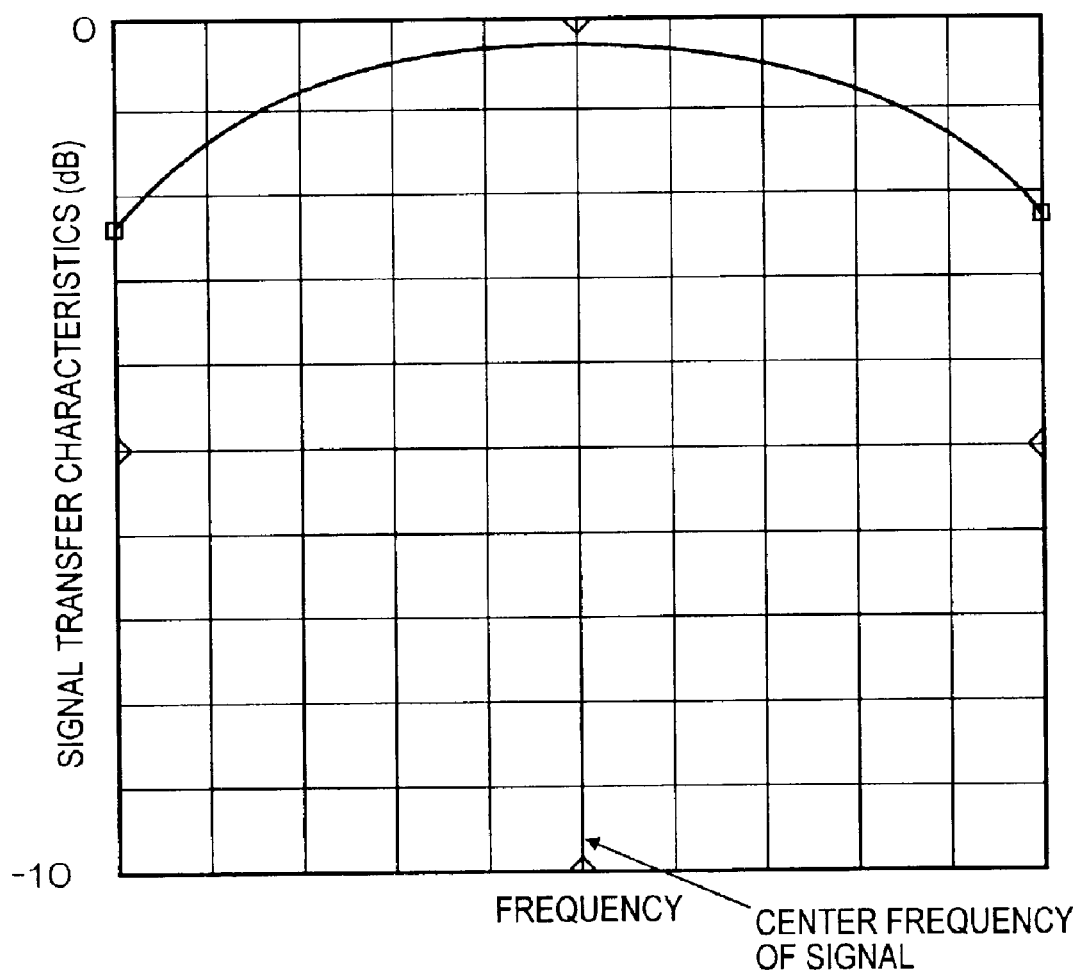
FIG. 10 graphically shows signal transfer characteristics from point O to point S of the output selection circuit when the bandpass filter 3 is not in its superconducting state.

FIG. 10 shows a signal transfer characteristic from point O to point S in FIG. 7 when the line length L2 is designed in the manner mentioned above and the bandpass filter is not in its superconducting state. As in FIG. 9, the center frequency of the desired input h.f. signal is located at the center of the abscissa. When not in the superconducting state, an efficient signal transmission can be achieved from point O to point S, that is, to the normal conducting bandpass filter 15 on the second signal path SP2 while bypassing the superconducting bandpass filter 3 on the first signal path SP1.

Figure 11:
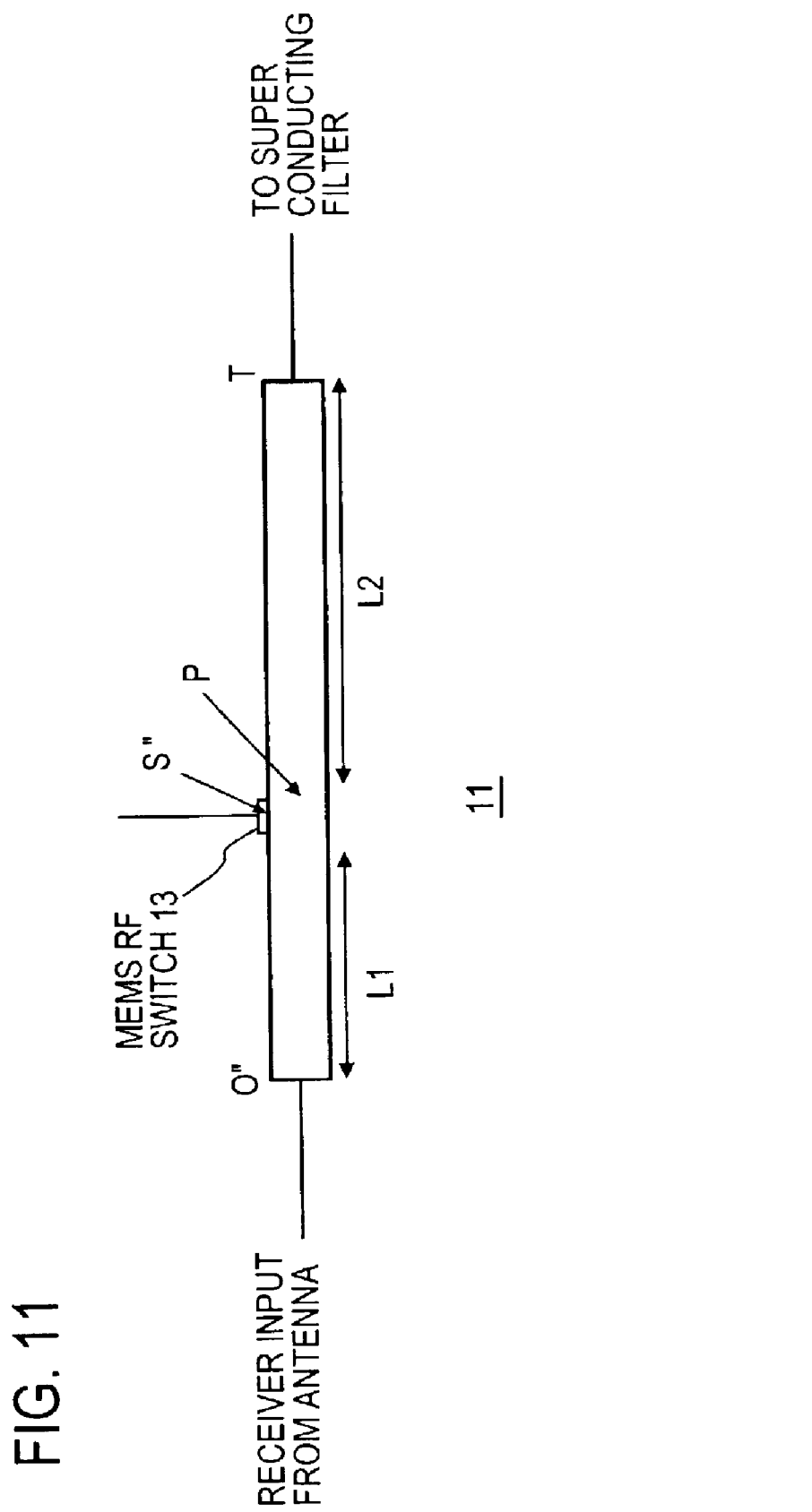
FIG. 11 is an illustration of an output selection circuit when an MEMS RF switch is used for the switch element.

FIG. 11 shows an embodiment of the output selection circuit 11 when an MEMS RF switch is used as the switch element 13. The difference between FIGS. 7 and 11 is that L3 is equal to zero. This is because physical connection between switch terminals in MEMS RF switch is established when the switch is turned on while there is no physical connection between the switch terminals when it is turned off. As a result, the impedance of point S" is matched if the MEMS RF switch is turned on and is open if the MEMS RF switch is turned off. Since L3 is equal to zero, signal transmission to the bandpass filter 15 can be achieved with a lower loss compared with the output circuit shown in FIG. 7.

The switch element 13 comprises an RF switch formed by PIN diode or an MEMS(microelectromechanical system) RF switch (see, for example, J. J. Yao and M. F. Chang: A Surface Micromachined Miniature Switch for Telecommunications Applications with Signal Frequencies from DC up to 4 GHz, ibid, pp. 384–387), for example.

The level detector 14 turns the switch element 13 on if it detects a reflected wave from the superconducting bandpass filter 3 (or a mismatch condition) through the circulator 12 when the temperature of the bandpass filter 3 exceeds the critical point. Consequently, the received h.f. signal from the output selection circuit 11 is routed through the second signal path SP2 to the coupler 17. If the level detector 14 detects no reflected wave, this means that the superconducting bandpass filter 3 is in its superconducting state, and the switch element 13 is maintained off.

The bandpass filter 15 and the low noise amplifier 16 on the second signal path SP2 are such ones that the former is operable at a temperature above the critical point and the latter exerts the best performance at a temperature above the critical point.

In the embodiment shown in FIG. 6, a temperature detecting element 18S provided in the vacuum chamber 8 as indicated in broken lines in FIG. 6 may be utilized to detect that the temperature of the superconducting bandpass filter 3 has exceeded the critical point to turn the switch element on. The detected temperature may be compared against a critical temperature value in a decision unit 18 so that the switch element 13 can be turned on if the detected temperature is above the critical temperature. The embodiment of the high frequency unit shown in FIG. 6 is applicable to any embodiment of the high sensitive radio receiver system shown in FIGS. 2, 4 and 5. However, when applied to the embodiments shown in FIGS. 4 and 5, each set of the vacuum chamber 8 and the cooling unit 9 is shared by a plurality of high frequency receiver units.

Fifth Embodiment

Figure 12:
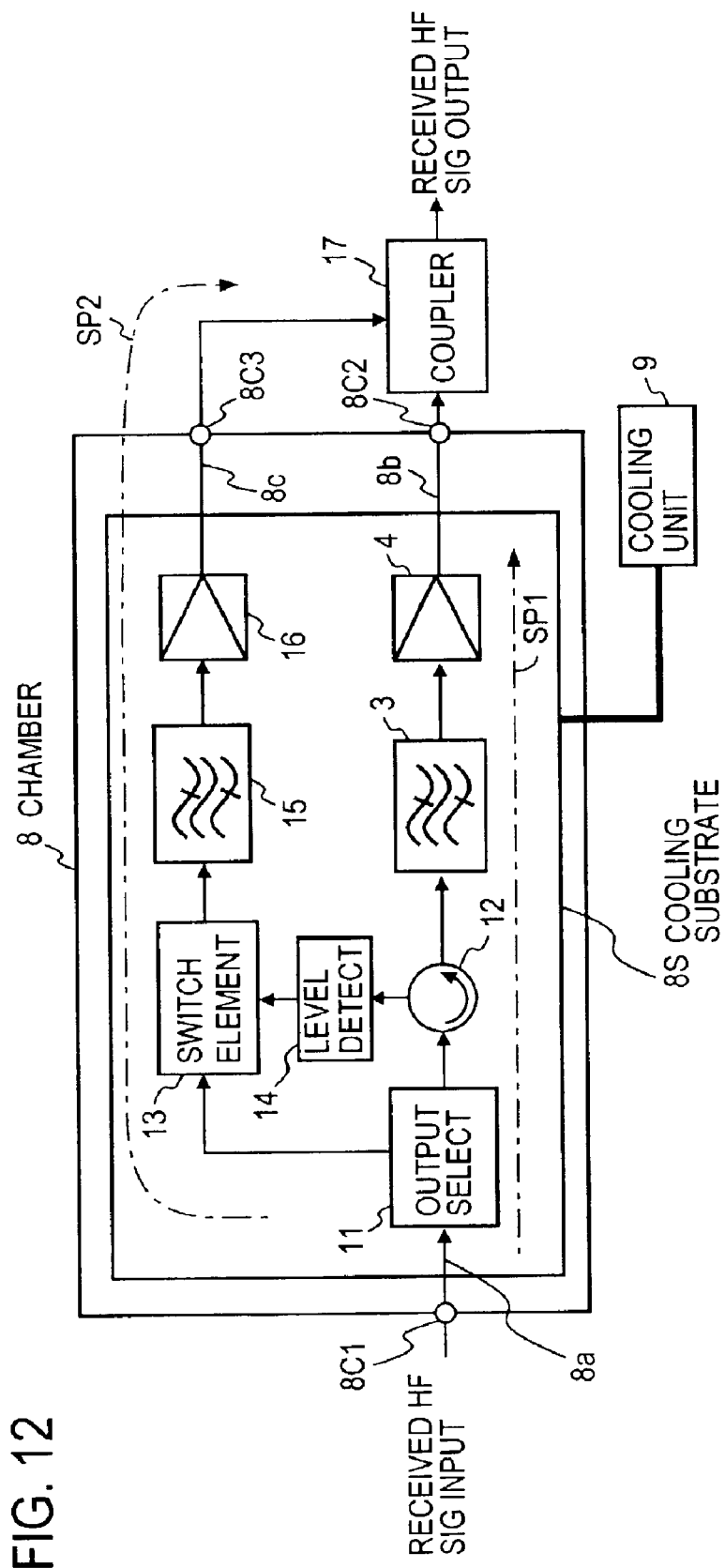
FIG. 12 is a block diagram showing another arrangement of the high frequency receiver unit according to the present invention.

FIG. 12 shows another embodiment of the high frequency receiver unit according to the present invention. As a distinction from the embodiment shown in FIG. 6, the output selection circuit 11, the switch element 13, the normal conducting bandpass filter 15, the low noise amplifier 16, the circulator 12 and the level detector 14 are also contained in the vacuum chamber 8 to be cooled by the cooling unit 9. This allows thermal noises which are added in the output selection circuit 11 and the circulator 12 to be reduced when the superconducting bandpass filter 3 is its superconducting state.

Sixth Embodiment

Figure 13:
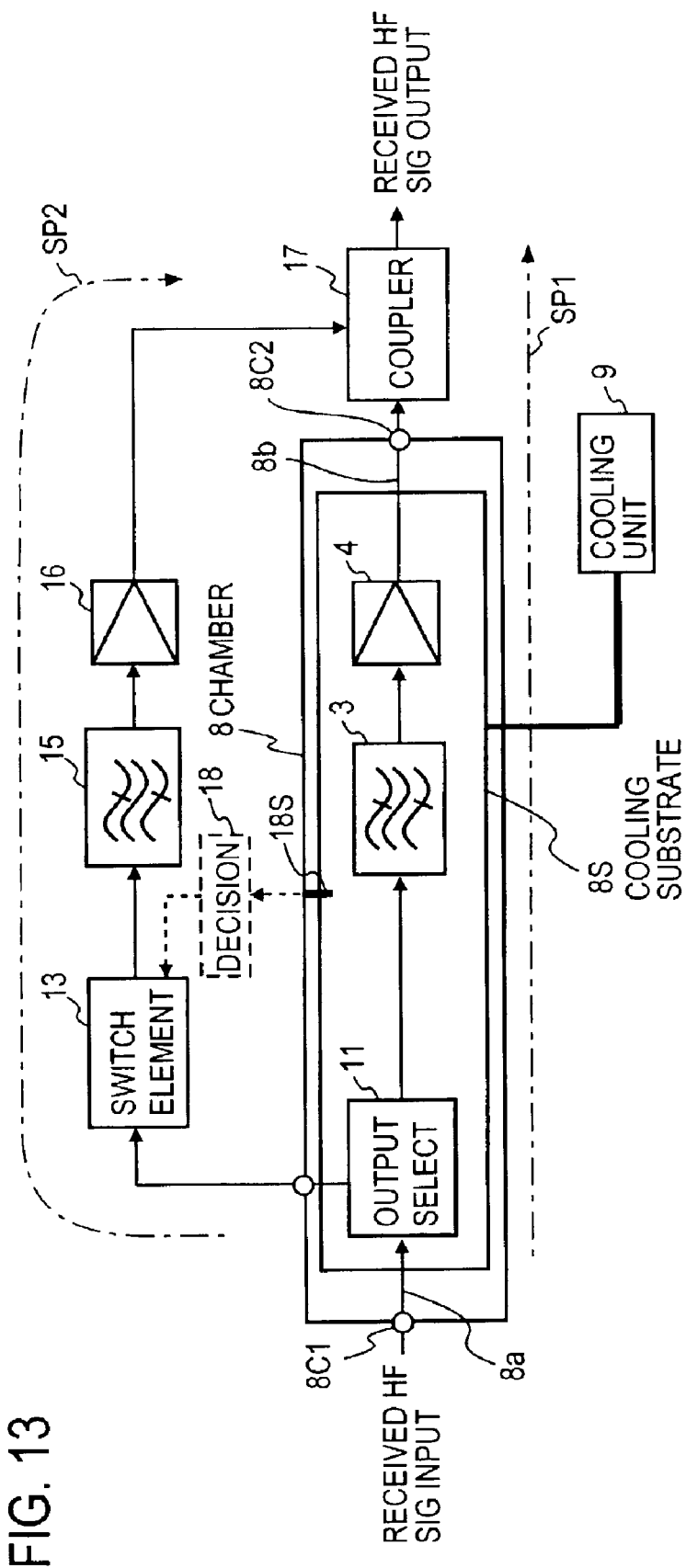
FIG. 13 is a block diagram showing a further arrangement of the high frequency receiver unit according to the present invention.

In the embodiment shown in FIG. 12, the switch element 13, the normal conducting bandpass filter 15 and the low noise amplifier 16 on the second signal path SP2 may be disposed outside the vacuum chamber 8, as shown in FIG. 13, thus avoiding a cooling of these elements. In the example shown in FIG. 13, the superconducting state is monitored rather than by the detection of reflected wave, but by sensing a cooling temperature through the temperature sensor 18S disposed within the vacuum chamber 8. The decision unit 18 determines whether the detected temperature by the temperature sensor 18S is above the critical point or not. If the detected temperature is equal to or above the critical point, the switch element 13 is set to turn on.

Seventh Embodiment

Figure 14:
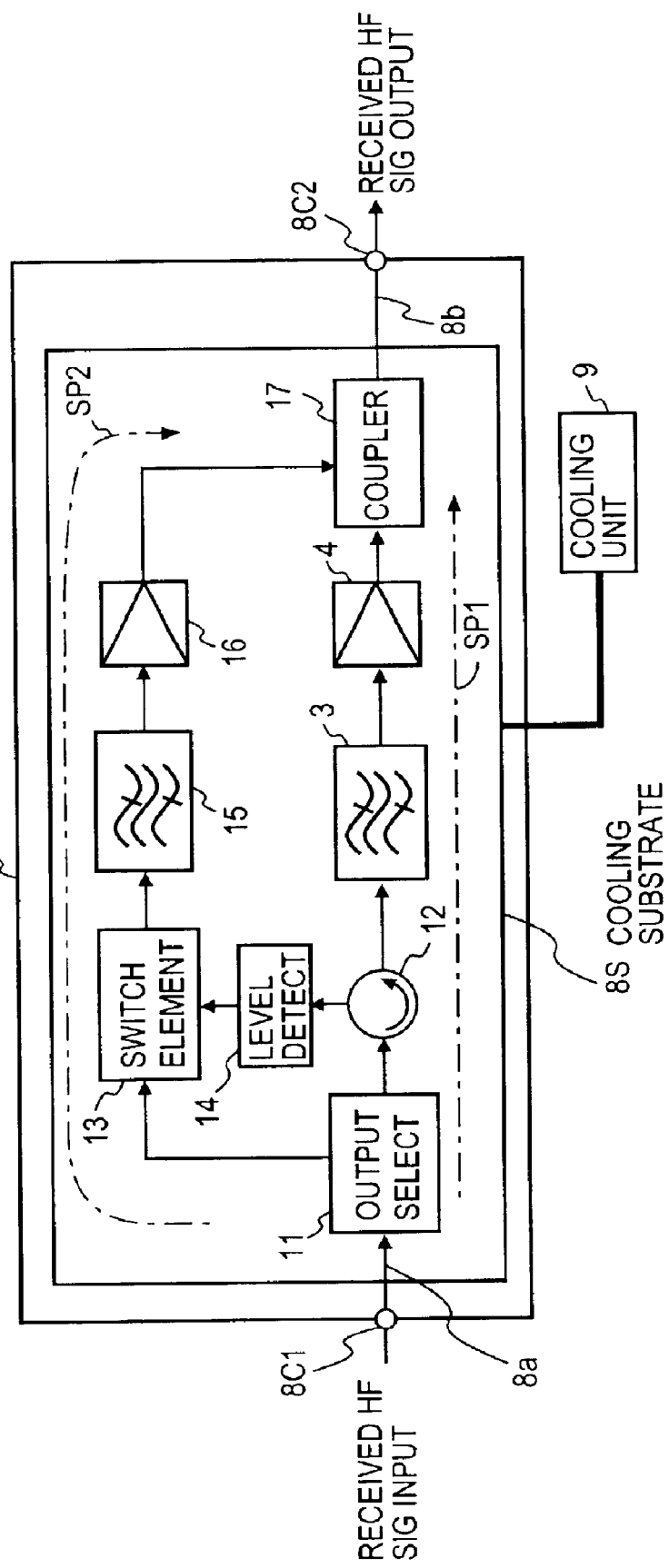
FIG. 14 is a block diagram showing yet another arrangement of the high frequency receiver unit according to the present invention.

FIG. 14 shows a further embodiment of the high frequency unit according to the present invention. In this embodiment, the coupler 17 shown in the embodiment of FIG. 12 is also contained within the vacuum chamber 8 to be cooled. This allows thermal noises which are added by the coupler 17 to be reduced when the superconducting bandpass filter 3 is in its superconducting state. In this case, since the coupler 17 is disposed in the vacuum chamber 8, the number of coaxial cables connected to the vacuum chamber 8 can be reduced, whereby a heat flow from the outside of the vacuum chamber 8 through the coaxial cable 8c and a coaxial connector 8C3 shown in FIG. 12 can be eliminated, contributing to a reduction in the power consumption and the size of the system.

Alternatively, the switch element 13, the normal conducting bandpass filter 15 and the low noise amplifier 16 may be disposed outside the vacuum chamber 8 to avoid their cooling, even though this increases the number of coaxial cables and connectors.

Eighth Embodiment

Figure 15:
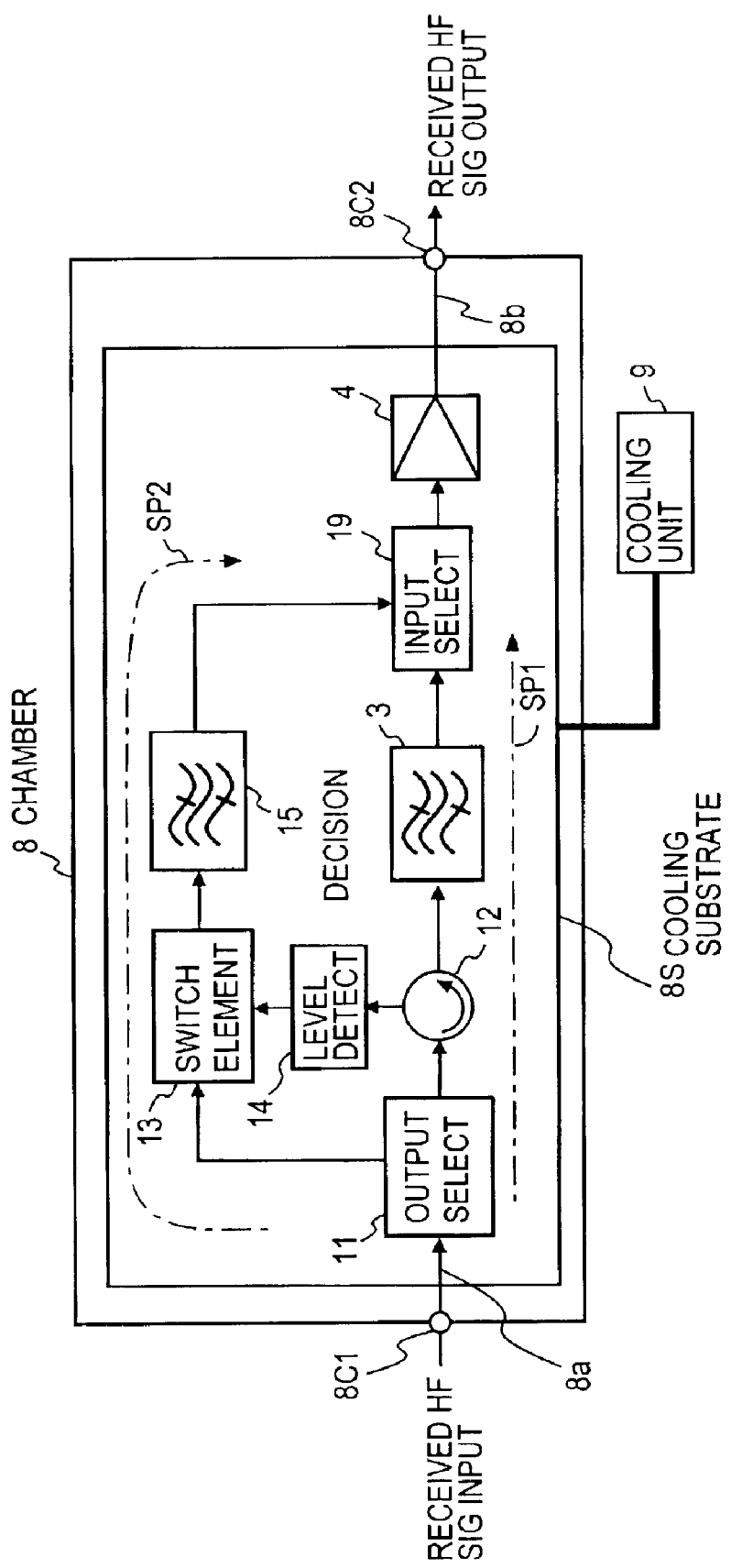
FIG. 15 is a block diagram showing still another arrangement of the high frequency receiver unit according to the present invention.

FIG. 15 shows still another embodiment of the high frequency receiver unit according to the present invention. This embodiment is a modification of the embodiment shown in FIG. 14 in that the two low noise amplifiers 4, 16 and the coupler 17 are replaced by an input selection circuit 19 and a single low noise amplifier 4. The input selection circuit 19 selects either output from the bandpass filters 3 and 15 to feed it to the low noise amplifier 4. The low noise amplifier 4 is designed to operate not only below but also equal to or above the critical temperature.

Figure 16:
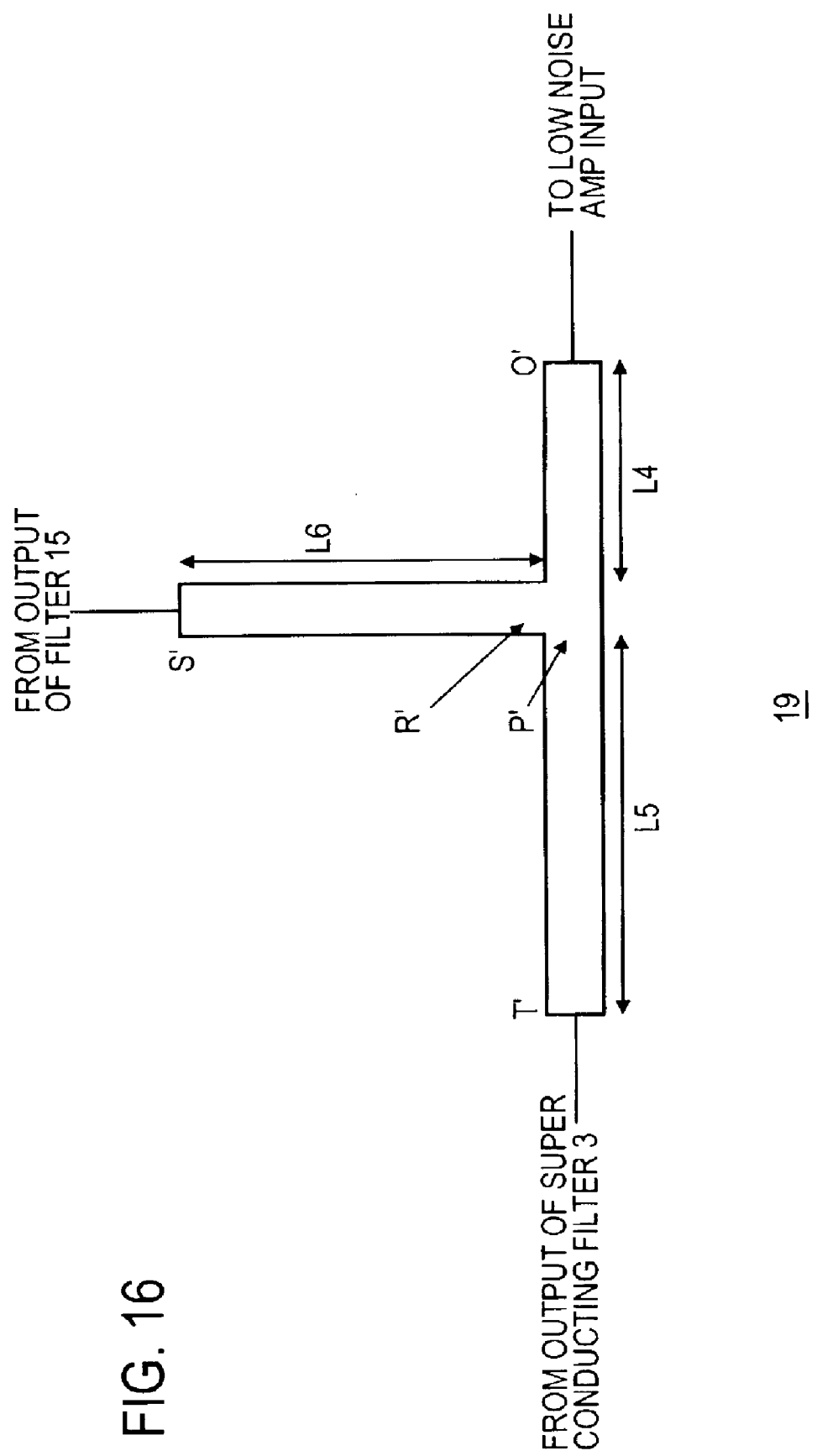
FIG. 16 is an illustration of an example of input selection circuit used in the high frequency receiver unit shown in FIG. 15.

FIG. 16 shows an example of the input selection circuit 19 shown in FIG. 15. L4, L5 and L6 represent line lengths, respectively. The line length L4 is determined depending on the peripheral settings as mentioned with L1, but is desirable to be chosen as short as possible in view of reducing the signal loss. The line lengths L5 and L6 are determined in the similar manner as mentioned above for the choice of those of L2 and L3 described above in connection with FIGS. 7 and 8, respectively. Specifically, L6 is chosen so that the impedance at point R' is infinity when the bandpass filter 3 is in its superconducting state and switch element 13 is turned off, whereby the impedance at point S' is mismatched. The line length L5 is chosen so that the impedance at point P' is infinity when the bandpass filter 3 is not in its superconducting state. As a consequence, when the bandpass filter 3 is in its superconducting state, the signal from the bandpass filter 3 is delivered to the low noise amplifier 4, while when the bandpass filter 3 is not in its superconducting state, the signal from the normal conducting bandpass filter 15 is delivered to the low noise amplifier 4. The input selection circuit 19 avoids the need for the provision of the low noise amplifier on the second signal path SP2, contributing to a reduction in the power consumption and the size of the receiver system.

Ninth Embodiment

Figure 17:
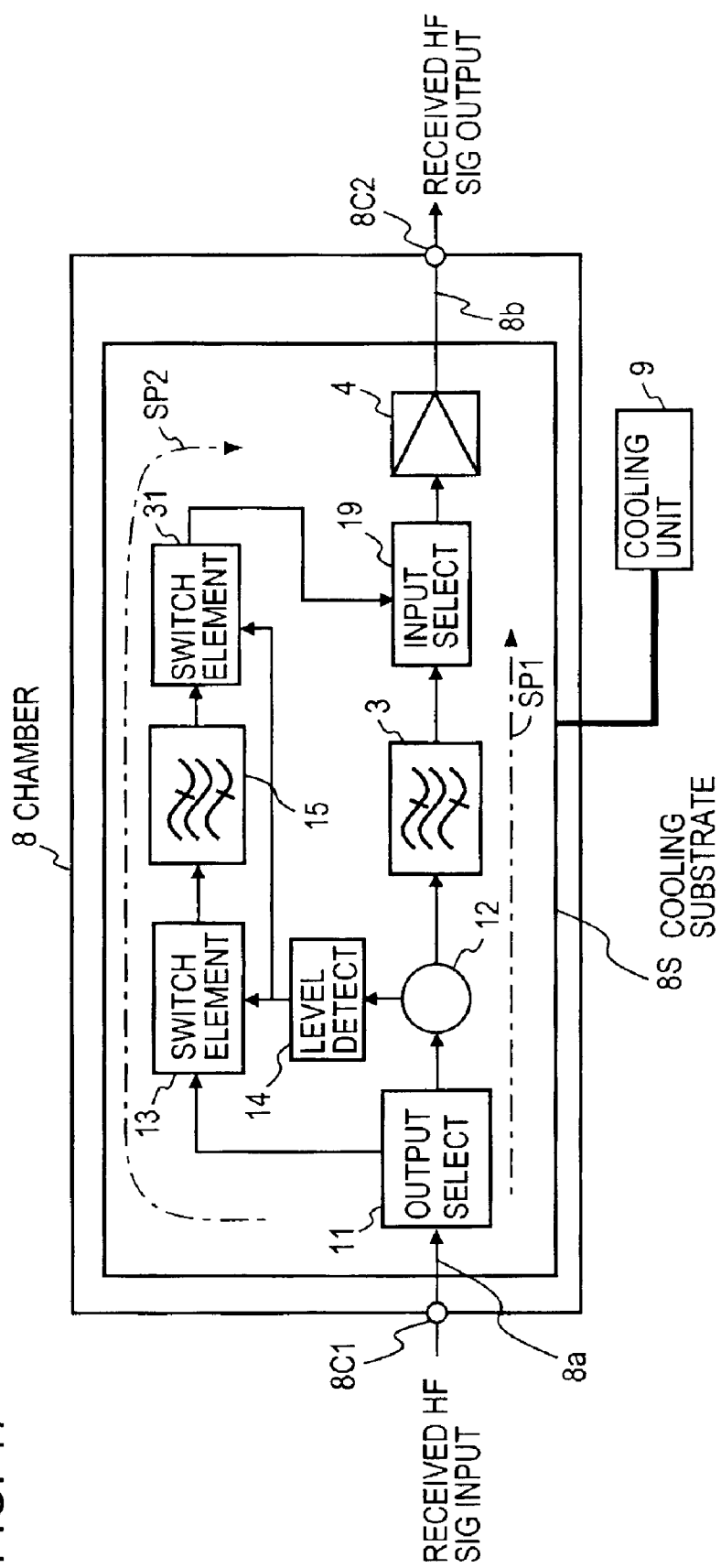
FIG. 17 is a block diagram of an additional arrangement of the high frequency receiver unit according to the present invention.

FIG. 17 shows yet another embodiment of the high frequency receiver unit according to the present invention. This embodiment is also a modification of the embodiment shown in FIG. 15 in that a switch element 31 is connected between the normal conducting bandpass filter 15 and the input selection circuit 19. The both switch elements 13 and 31 are set to turn on if the level detector 14 detects that the bandpass filter 3 is not in its superconducting state. The connection of switch element 31 between the bandpass filter 15 and the input selection circuit 19 yields that only the switch element 31 determines the impedance at point S' in FIG. 16 regardless of what type of filter is used as the bandpass filter 15. Based on this impedance, L6 can be determined such that the impedance at point R' may be infinity when the bandpass filter 3 is in its superconducting state. As a result, any filter can be used as a normal conducting bandpass filter 15 without any modification of L6, allowing the use of the bandpass filter 15 for higher general purposes compared to the embodiment of FIG. 15. The switch element 31 is set to turn off when the bandpass filter 3 is rendered in a superconducting state by the level detector 14 and turn on when not rendered in a superconducting state in a similar manner as the switch element 13.

Figure 18:
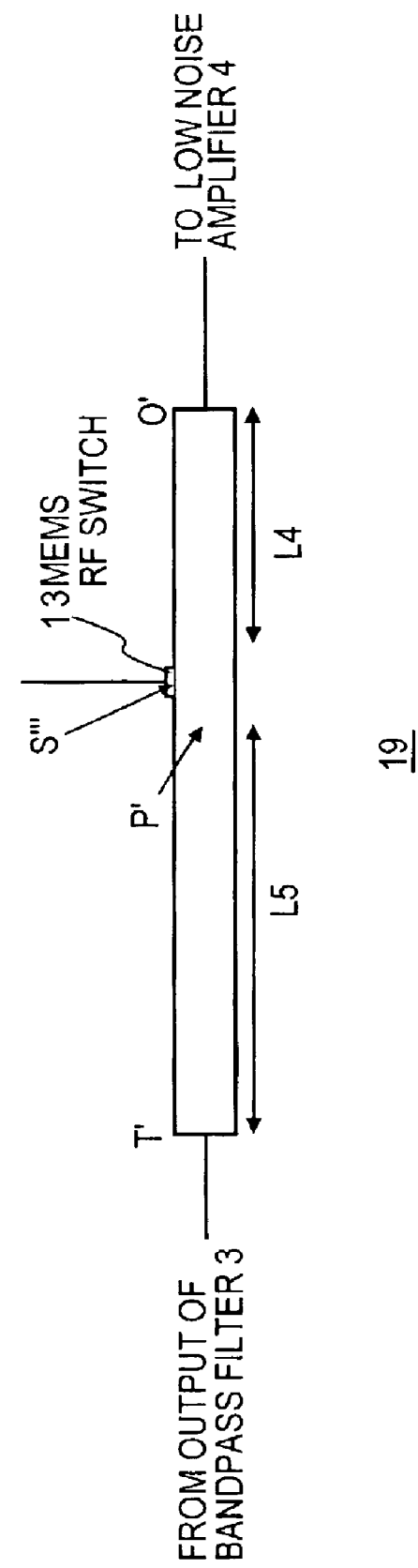
FIG. 18 is an illustration of an example of input selection circuit when an MEMS RF switch is used for the switch element.

FIG. 18 shows an embodiment of the input selection circuit 19 when an MEMS RF switch is used as the switch element 31. The input selection circuit 19 differs from that in FIG. 16 in that L6 is equal to zero. This is because the MEMS RF switch is used for the switch element, in a similar manner as in the embodiment of the output selection circuit 11 shown in FIG. 11. By reducing L6 to zero, the signal transmission to the low noise amplifier 4 can be made with a lower loss.

In the described embodiments shown in FIGS. 6, 12 to 15 and 17, the output selection circuit 11 and the input selection circuit 19 are constructed with microstrip lines, but other lines having similar characteristics may be used such as coaxial cables, strip lines, or lumped parameter networks, for example. Each embodiment of the high frequency receiver units shown in FIGS. 6, 12 to 15 and 17 is applicable to any embodiment of the high sensitive radio receiver system shown in FIGS. 2, 4 and 5.

Effects of the Invention

As described above, according to the present invention, if a fault occurs with a cooling unit of a high sensitive radio receiver system, a degraded reception or the inability of reception for all the sectors can be avoided.

Also with the high frequency receiver unit according to the present invention, when a rapid degradation in the performance of the superconducting bandpass filter occurs as a result of a temperature rise or a failure, a change in the input and output impedance of the superconducting bandpass filter can be utilized to transfer a received signal to an auxiliary circuit, thus avoiding inoperability of the receiver system.

What is claimed is:

1. A high sensitive radio receiver system for receiving signals from a plurality of antennae provided in each of a plurality of sectors comprising:

a plurality of vacuum chambers;

a plurality of cooling units each for cooling respective interiors of the plurality of vacuum chambers;

a plurality of high frequency units each provided for a corresponding one of said plurality of antennae;

each of said plurality of high frequency units including a series connection of a superconducting bandpass filter for deriving a received high frequency signal in a predetermined frequency band and a first low noise amplifier operable at least at or below a critical temperature of said superconducting bandpass filter for amplifying and delivering the received high frequency signal, said series connection constituting a first signal path and contained in one of the vacuum chambers;

a second signal path that bypasses said first signal path, an output selection circuit configured to provide the received high frequency signal from corresponding one of said plurality of antennae selectively to one of said first and second signal paths, wherein said selection circuit is adapted such that when the temperature of said superconducting bandpass filter is higher than the critical temperature, an impedance of said superconducting bandpass filter mismatches that of said output selection circuit to inhibit transmission of the received high frequency signal to said first low noise amplifier and to supply said received high frequency signal to said second signal path and when the temperature of said superconducting bandpass filter is below the critical temperature, the impedance of said superconducting bandpass filter substantially matches that of said output selection circuit to allow transmission of the received high frequency signal from said output selection circuit to said first low noise power amplifier, and at least two antennae of each sector are connected to the output selection circuits of different one of said plurality of high frequency units.

2. A high sensitive radio receiver system according to claim 1, in which the superconducting material of said superconducting bandpass filter is a high temperature superconducting material.

3. A high sensitive radio receiver system according to claim 1 or 2, further comprising:

an antenna duplexer connected between one of the plurality of antennae in each sector and the superconducting bandpass filter connected thereto, and having a transmission input terminal so that the antenna is shared for the transmission and reception.

4. A high sensitive radio receiver system according to claim 1, in which said second signal path includes a normal conducting bandpass filter which operates not only below but also equal to or above the critical temperature of the superconducting bandpass filter and having a substantially same passband as the superconducting bandpass filter for delivering the received high frequency signal while bypassing the first signal path whenever the superconducting bandpass filter is no longer in its superconducting state.

5. A high sensitive radio receiver system according to claim 4, in which a second low noise amplifier which operates not only below but also equal to or above the critical temperature is connected in series to the output of the normal conducting bandpass filter in the second signal path, and further comprising a coupler which combines the output of the first signal path and the output of the second signal path to deliver the received high frequency signal.

6. A high sensitive radio receiver system according to claim 5, in which the coupler is disposed within the vacuum chamber.

7. A high sensitive radio receiver system according to claim 4, in which an input selection circuit is connected between the superconducting bandpass filter and the first low noise amplifier on the first signal path of each high frequency unit for selecting either an output from the superconducting bandpass filter or an output from the normal conducting bandpass filter for input to the first low noise amplifier.

8. A high sensitive radio receiver system according to claim 7, further comprising:

a signal path output switch element inserted in the second signal path at the output of the normal conducting bandpass filter of each high frequency unit to be turned off when the superconducting bandpass filter is in its superconducting state and to be turned on when the superconducting bandpass filter is not in its superconducting state.

9. A high sensitive radio receiver system according to any one of claims 5 to 8, in which the output selection circuit is disposed within the vacuum chamber.

10. A high sensitive radio receiver system according to any one of claims 5 to 8, in which the normal conducting bandpass filter is disposed within the vacuum chamber.

11. A high sensitive radio receiver system according to any one of claims 5 to 8, in which each high frequency unit comprises a signal path input switch element connected to the input of the normal conducting bandpass filter in the second signal path, and detecting means for detecting whether or not the superconducting bandpass filter is in its superconducting state to turn the signal path input switch element off when the superconducting bandpass filter is in its superconducting state and to turn the signal path input switch element on when the superconducting bandpass filter is not in its superconducting state.

12. A high sensitive radio receiver system according to claim 11, in which said detecting means comprises means which detects a reflected wave from the superconducting bandpass filter when it is not in its superconducting state and which turn the signal path input switch element on in response to a detection output.

13. A high sensitive radio receiver system according to claim 11, in which said detecting means comprises means which detects a temperature within the vacuum chamber and which turn the signal path input switch element on whenever the temperature is equal to or above the critical temperature.

14. A high frequency unit for filtering, amplifying and delivering a received high frequency signal which is input thereto, comprising:
   a vacuum chamber;
   a cooling unit configured to cool an interior of the vacuum chamber;
   a first signal path contained within the vacuum chamber and including a series connection of a superconducting bandpass filter which operates in a superconducting state at or below a critical temperature and a first low noise amplifier for passing a received high frequency signal therethrough;
   a second signal path including a normal conducting bandpass filter which operates at least above the critical temperature of the superconducting bandpass filter and having a substantially same passband as the superconducting bandpass filter and which delivers the received high frequency signal while bypassing the first signal path whenever the superconducting bandpass filter is no longer in the superconducting state; and
   an output selection circuit which delivers the received high frequency h.f. signal which is input to the high frequency unit to the first signal path when the superconducting bandpass filter is in the superconducting state and to the second signal path when the superconducting bandpass filter is not in the superconducting state,
   wherein said output selection, circuit is adapted such that when the temperature of said superconducting bandpass filter is higher than the critical temperature, an impedance of said superconducting bandpass filter mismatches that of said output selection circuit to inhibit transmission of the received high frequency signal to said first low noise amplifier and to supply said received high frequency signal to said second signal path, and when the temperature of said superconducting bandpass filter is below the critical temperature, the impedance of said superconducting bandpass filter substantially matches that of said output selection circuit to allow transmission of the received high frequency signal from said output selection circuit to said first low noise power amplifier.

15. A high frequency unit according to claim 14, in which the second signal path comprises a second low noise amplifier which operates not only below but also equal to or above the critical temperature and connected in series to the output of the normal conducting bandpass filter of the second signal path, and a coupler which combines an output from the first signal path and an output from the second signal path to deliver the received high frequency signal.

16. A high frequency unit according to claim 15, in which the coupler is disposed within the vacuum chamber.

17. A high frequency unit according to claim 14, further comprising an input selection circuit connected between the superconducting bandpass filter and the first low noise amplifier on the first signal path for selecting either an output from the superconducting bandpass filter or an output from the normal conducting bandpass filter for input to the first low noise amplifier.

18. A high frequency unit according to claim 17, further comprising:
   a signal path output switch element inserted in the second signal path at the output of the normal conducting bandpass filter and adapted to be turned off when the superconducting bandpass filter is in its superconducting state and to be turned on when the superconducting bandpass filter is not in its superconducting state.

19. A high frequency unit according to any one of claims 14, 15 and 18, in which the output selection circuit is disposed within the vacuum chamber.

20. A high frequency unit according to any one of claims 14, 15, and 18, in which the normal conducting bandpass filter is disposed within the vacuum chamber.

21. A high frequency unit according to any one of claims 15 to 18, further comprising:
   a signal path input switch element connected to the input of the normal conducting bandpass filter on the second signal path; and
   detecting means for detecting whether or not the superconducting bandpass filter is in its superconducting state and for turning the signal path input switch element off when the superconducting bandpass filter is in its superconducting state and turning the signal path input switch element on when the superconducting bandpass filter is not in its superconducting state.

22. A high frequency unit according to claim 21, in which the output selection circuit comprises a microstrip line having a predetermined characteristic impedance and having a branch port.

23. A high frequency unit according to claim 22, in which the signal path input switch element comprises an MEMS RF switch formed at the branch point.

24. A high frequency unit according to claim 21, in which the detecting means comprises means which detects a reflected wave from the superconducting bandpass filter when it is not in its superconducting state and which turns the signal path input switch element on in response to a detection output.

25. A high frequency unit according to claim 21, in which the detecting means comprises means which detects a temperature within the vacuum chamber and which turns the signal path input switch element on whenever the temperature is equal to or above the critical temperature.

* * * * *